United States Patent
Liao

(10) Patent No.: US 9,229,193 B2
(45) Date of Patent: Jan. 5, 2016

(54) IMAGING LENS, AND ELECTRONIC APPARATUS INCLUDING THE SAME

(71) Applicant: Genius Electronic Optical Co., Ltd., Taichung (TW)

(72) Inventor: Chen-Cheng Liao, Taichung (TW)

(73) Assignee: GENIUS ELECTRONIC OPTICAL CO., LTD. (TW)

( * ) Notice: Subject to any disclaimer, the term of this patent is extended or adjusted under 35 U.S.C. 154(b) by 0 days.

(21) Appl. No.: 14/175,290

(22) Filed: Feb. 7, 2014

(65) Prior Publication Data

US 2015/0092284 A1    Apr. 2, 2015

(30) Foreign Application Priority Data

Sep. 30, 2013   (TW) .............................. 102135348 A

(51) Int. Cl.
*G02B 3/02* (2006.01)
*G02B 13/00* (2006.01)

(52) U.S. Cl.
CPC ................................. *G02B 13/0045* (2013.01)

(58) Field of Classification Search
CPC .................................................. G02B 13/0045
USPC .............................................................. 359/714
See application file for complete search history.

(56) References Cited

U.S. PATENT DOCUMENTS

| 7,538,958 | B2 | 5/2009 | Tang |
| 7,746,572 | B2 | 6/2010 | Asami |
| 7,911,712 | B2 | 3/2011 | Kitahara et al. |
| 8,345,323 | B2 | 1/2013 | Otomo |
| 2010/0254029 | A1 | 10/2010 | Shinohara |
| 2011/0316969 | A1 | 12/2011 | Hsieh et al. |
| 2013/0057967 | A1* | 3/2013 | Tang et al. ............... 359/714 |
| 2013/0107376 | A1 | 5/2013 | Tsai et al. |

FOREIGN PATENT DOCUMENTS

| JP | H10-221601 A | 8/1998 |
| JP | 2007-148137 A | 6/2007 |
| JP | 2007-249189 A | 9/2007 |
| JP | 2010-8562 A | 1/2010 |
| JP | 2011-133600 A | 7/2011 |
| TW | M369459 U | 11/2009 |
| TW | 201213844 A | 4/2012 |
| TW | 201232021 A | 8/2012 |
| TW | 5052956 B2 | 10/2012 |
| WO | 2004107009 A1 | 12/2004 |

* cited by examiner

*Primary Examiner* — James Jones
(74) *Attorney, Agent, or Firm* — Baker & McKenzie LLP

(57) ABSTRACT

An imaging lens includes first to fifth lens elements arranged from an object side to an image side in the given order. Through designs of surfaces of the lens elements and relevant optical parameters, a short system length of the imaging lens may be achieved while maintaining good optical performance.

19 Claims, 32 Drawing Sheets system focal length =1.069mm, half field-of-view =60.0°, F-number =2.78, system length =5.075mm

| lens element | surface | radius of curvature | thickness | refractive index | Abbe number | material | focal length |
|---|---|---|---|---|---|---|---|
| object | | ∞ | ∞ | | | | |
| first lens element 3 | object-side surface 31 | 4.069 | 0.481 | 1.532 | 56.064 | plastic | -1.532 |
| | image-side surface 32 | 0.653 | 0.507 | | | | |
| second lens element 4 | object-side surface 41 | 2.552 | 0.659 | 1.637 | 23.231 | plastic | 2.314 |
| | image-side surface 42 | -3.202 | 0.131 | | | | |
| aperture stop 2 | | ∞ | 0.288 | | | | |
| third lens element 5 | object-side surface 51 | -4.545 | 0.720 | 1.545 | 55.930 | plastic | 1.673 |
| | image-side surface 52 | -0.804 | 0.050 | | | | |
| fourth lens element 6 | object-side surface 61 | 48.651 | 0.755 | 1.545 | 55.930 | plastic | 1.839 |
| | image-side surface 62 | -1.021 | 0.057 | | | | |
| fifth lens element 7 | object-side surface 71 | -1.065 | 0.283 | 1.637 | 23.231 | plastic | -2.174 |
| | image-side surface 72 | -4.953 | 0.070 | | | | |
| optical filter 8 | object-side surface 81 | ∞ | 0.655 | | | | |
| | image-side surface 82 | ∞ | 0.419 | | | | |
| image plane 9 | | ∞ | 0.000 | | | | |

FIG.3

| surface | 31 | 32 | 41 | 42 | 51 |
|---|---|---|---|---|---|
| K | -1.324E+01 | -7.238E-01 | -1.860E+01 | -2.118E+01 | 6.072E+01 |
| a4 | -3.232E-02 | -2.514E-01 | 2.592E-02 | 1.794E-01 | 3.233E-02 |
| a6 | -4.005E-03 | -2.108E-01 | 2.901E-01 | 1.342E-02 | -1.082E+00 |
| a8 | 6.508E-04 | 5.857E-02 | -2.024E-01 | -4.063E-01 | 5.112E+00 |
| a10 | -1.082E-04 | -1.881E-01 | -3.918E-01 | 2.761E+00 | -1.134E+01 |
| a12 | | -1.570E-02 | | -2.255E+01 | 1.259E+01 |
| surface | 52 | 61 | 62 | 71 | 72 |
| K | -4.973E-02 | -2.531E+01 | -1.356E-01 | -5.829E-02 | 0.000E+00 |
| a4 | 4.879E-02 | -6.378E-02 | 1.171E-01 | 1.293E-01 | 2.100E-01 |
| a6 | 1.505E-01 | 3.713E-02 | 2.021E-01 | 1.874E-01 | -9.984E-02 |
| a8 | -3.498E-02 | -3.346E-02 | 7.764E-02 | 2.583E-02 | 1.123E-02 |
| a10 | 1.584E-01 | -7.882E-03 | 6.911E-03 | 7.352E-03 | -2.136E-03 |
| a12 | | | | | 2.157E-04 |

FIG.4

FIG.7 system focal length =1.028mm, half field-of-view =58.0°, F-number =2.80, system length =5.216mm

| lens element | surface | radius of curvature | thickness | refractive index | Abbe number | material | focal length |
|---|---|---|---|---|---|---|---|
| object | | ∞ | ∞ | | | | |
| first lens element 3 | object-side surface 31 | 3.642 | 0.430 | 1.545 | 55.930 | plastic | -1.497 |
| | image-side surface 32 | 0.640 | 0.688 | | | | |
| second lens element 4 | object-side surface 41 | 2.178 | 0.682 | 1.585 | 29.909 | plastic | 2.220 |
| | image-side surface 42 | -2.892 | 0.187 | | | | |
| aperture stop 2 | | ∞ | 0.323 | | | | |
| third lens element 5 | object-side surface 51 | -4.904 | 0.691 | 1.532 | 56.064 | plastic | 1.735 |
| | image-side surface 52 | -0.819 | 0.050 | | | | |
| fourth lens element 6 | object-side surface 61 | -78.833 | 0.596 | 1.545 | 55.930 | plastic | 1.928 |
| | image-side surface 62 | -1.043 | 0.040 | | | | |
| fifth lens element 7 | object-side surface 71 | -1.090 | 0.601 | 1.585 | 29.909 | plastic | -2.322 |
| | image-side surface 72 | -6.462 | 0.325 | | | | |
| optical filter 8 | object-side surface 81 | ∞ | 0.300 | | | | |
| | image-side surface 82 | ∞ | 0.303 | | | | |
| image plane 9 | | ∞ | 0.000 | | | | |

| surface | 31 | 32 | 41 | 42 | 51 |
|---|---|---|---|---|---|
| K | -1.278E+01 | -7.211E-01 | -1.762E+01 | -9.153E+00 | 4.961E+01 |
| a4 | -3.317E-02 | -2.582E-01 | 3.357E-02 | 1.353E-01 | -2.877E-02 |
| a6 | -3.408E-03 | -1.700E-01 | 2.600E-01 | -1.077E-01 | -1.179E+00 |
| a8 | 6.068E-04 | 6.885E-02 | -1.866E-01 | -4.044E-01 | 4.622E+00 |
| a10 | -2.321E-04 | -1.584E-01 | -4.611E-01 | -1.983E+00 | -1.034E+01 |
| a12 | | -4.568E-03 | | 1.349E+01 | 1.583E+01 |

| surface | 52 | 61 | 62 | 71 | 72 |
|---|---|---|---|---|---|
| K | -2.535E-01 | -4.962E+02 | -1.406E-01 | -3.848E-02 | 0.000E+00 |
| a4 | 1.430E-02 | -2.298E-02 | 1.610E-01 | 1.501E-01 | 2.998E-01 |
| a6 | 5.792E-02 | 1.588E-02 | 2.004E-01 | 1.938E-01 | -1.395E-01 |
| a8 | -1.448E-01 | -4.333E-02 | 6.673E-02 | 3.435E-02 | 3.022E-04 |
| a10 | 1.451E-01 | 2.321E-02 | -7.717E-03 | -1.456E-02 | -1.018E-03 |
| a12 | | | | | 3.829E-03 |

FIG.8

FIG.11 system focal length =0.938mm, half field-of-view =60.0°, F-number =2.80, system length =5.182mm

| lens element | surface | radius of curvature | thickness | refractive index | Abbe number | material | focal length |
|---|---|---|---|---|---|---|---|
| object | | ∞ | ∞ | | | | |
| first lens element 3 | object-side surface 31 | 4.129 | 0.270 | 1.545 | 55.930 | plastic | -1.430 |
| | image-side surface 32 | 0.642 | 0.686 | | | | |
| second lens element 4 | object-side surface 41 | 2.248 | 0.664 | 1.643 | 22.437 | plastic | 2.121 |
| | image-side surface 42 | -3.128 | 0.241 | | | | |
| aperture stop 2 | | ∞ | 0.470 | | | | |
| third lens element 5 | object-side surface 51 | -4.497 | 0.721 | 1.532 | 56.064 | plastic | 1.738 |
| | image-side surface 52 | -0.813 | 0.050 | | | | |
| fourth lens element 6 | object-side surface 61 | -318.849 | 0.431 | 1.545 | 55.930 | plastic | 1.979 |
| | image-side surface 62 | -1.079 | 0.051 | | | | |
| fifth lens element 7 | object-side surface 71 | -1.121 | 0.497 | 1.585 | 29.909 | plastic | -2.806 |
| | image-side surface 72 | -4.052 | 0.070 | | | | |
| optical filter 8 | object-side surface 81 | ∞ | 0.655 | | | | |
| | image-side surface 82 | ∞ | 0.376 | | | | |
| image plane 9 | | ∞ | 0.000 | | | | |

| surface | 31 | 32 | 41 | 42 | 51 |
|---|---|---|---|---|---|
| K | -1.250E+01 | -7.212E-01 | -1.941E+01 | -7.395E+00 | 5.523E+01 |
| a4 | -3.377E-02 | -2.551E-01 | 2.860E-02 | 1.349E-01 | -2.684E-02 |
| a6 | -4.265E-03 | -1.848E-01 | 2.540E-01 | -3.768E-02 | -1.124E+00 |
| a8 | 6.198E-04 | 7.582E-02 | -2.430E-01 | -8.726E-01 | 4.448E+00 |
| a10 | -2.846E-04 | -1.738E-01 | -5.503E-01 | -3.633E-02 | -1.100E+01 |
| a12 | | 2.078E-03 | | -4.533E+00 | 1.488E+01 |

| surface | 52 | 61 | 62 | 71 | 72 |
|---|---|---|---|---|---|
| K | -2.448E-01 | 1.505E+02 | -1.581E-01 | -7.259E-02 | 0.000E+00 |
| a4 | -4.901E-03 | -2.196E-02 | 1.699E-01 | 1.563E-01 | 2.874E-01 |
| a6 | 4.181E-02 | 1.353E-02 | 2.092E-01 | 1.934E-01 | -1.166E-01 |
| a8 | -1.684E-01 | -3.426E-02 | 7.589E-02 | 3.079E-02 | 9.037E-04 |
| a10 | 9.028E-02 | 3.516E-02 | -1.309E-04 | 3.336E-03 | -1.967E-04 |
| a12 | | | | | 4.121E-05 |

FIG.12

| system focal length =1.018mm, half field-of-view =58.0°, F-number =2.80, system length =5.169mm |||||||
|---|---|---|---|---|---|---|
| lens element | surface | radius of curvature | thickness | refractive index | Abbe number | material | focal length |
| object | | ∞ | ∞ | | | | |
| first lens element 3 | object-side surface 31 | 2.040 | 0.270 | 1.545 | 55.930 | plastic | -1.719 |
| | image-side surface 32 | 0.613 | 0.835 | | | | |
| second lens element 4 | object-side surface 41 | 2.091 | 0.653 | 1.643 | 22.437 | plastic | 1.948 |
| | image-side surface 42 | -2.796 | 0.175 | | | | |
| aperture stop 2 | | ∞ | 0.367 | | | | |
| third lens element 5 | object-side surface 51 | -4.871 | 0.945 | 1.532 | 56.064 | plastic | 1.808 |
| | image-side surface 52 | -0.860 | 0.050 | | | | |
| fourth lens element 6 | object-side surface 61 | -14.185 | 0.392 | 1.545 | 55.930 | plastic | 2.087 |
| | image-side surface 62 | -1.066 | 0.059 | | | | |
| fifth lens element 7 | object-side surface 71 | -1.124 | 0.410 | 1.585 | 29.909 | plastic | -2.743 |
| | image-side surface 72 | -4.189 | 0.070 | | | | |
| optical filter 8 | object-side surface 81 | ∞ | 0.655 | | | | |
| | image-side surface 82 | ∞ | 0.288 | | | | |
| image plane 9 | | ∞ | 0.000 | | | | |

FIG.15

| surface | 31 | 32 | 41 | 42 | 51 |
|---|---|---|---|---|---|
| K | -7.730E+00 | -7.236E-01 | -1.168E+01 | 7.303E+00 | 4.817E+01 |
| a4 | -4.649E-02 | -2.899E-01 | 5.619E-02 | 1.104E-01 | -1.400E-03 |
| a6 | -8.486E-03 | -1.794E-01 | 2.044E-01 | -9.000E-02 | -1.194E+00 |
| a8 | 3.170E-04 | 8.692E-02 | -3.288E-01 | -8.410E-01 | 3.940E+00 |
| a10 | 3.617E-04 | -1.522E-01 | -3.345E-01 | -1.305E+00 | -1.207E+01 |
| a12 | | 8.407E-03 | | 8.218E+00 | 1.529E+01 |
| surface | 52 | 61 | 62 | 71 | 72 |
| K | -2.761E-01 | 1.242E+02 | -1.147E-01 | -1.185E-01 | 0.000E+00 |
| a4 | 6.486E-02 | -6.681E-02 | 1.397E-01 | 1.403E-01 | 2.547E-01 |
| a6 | 4.659E-02 | -2.461E-03 | 2.148E-01 | 1.777E-01 | -1.094E-01 |
| a8 | -1.817E-01 | -3.812E-02 | 7.260E-02 | 2.206E-02 | -1.296E-03 |
| a10 | 7.433E-02 | 3.312E-02 | -4.140E-03 | 4.584E-04 | 1.796E-03 |
| a12 | | | | | 1.575E-03 |

FIG.16

| system focal length =1.059mm, half field-of-view =60.0°, F-number =2.78, system length =5.097mm | | | | | | | |
|---|---|---|---|---|---|---|---|
| lens element | surface | radius of curvature | thickness | refractive index | Abbe number | material | focal length |
| object | | ∞ | ∞ | | | | |
| first lens element 3 | object-side surface 31 | 5.911 | 0.400 | 1.532 | 56.064 | plastic | -1.534 |
| | image-side surface 32 | 0.702 | 0.337 | | | | |
| second lens element 4 | object-side surface 41 | 3.068 | 0.751 | 1.637 | 23.231 | plastic | 2.397 |
| | image-side surface 42 | -2.795 | 0.100 | | | | |
| aperture stop 2 | | ∞ | 0.425 | | | | |
| third lens element 5 | object-side surface 51 | -7.797 | 0.884 | 1.545 | 55.930 | plastic | 1.693 |
| | image-side surface 52 | -0.860 | 0.050 | | | | |
| fourth lens element 6 | object-side surface 61 | 16.891 | 0.658 | 1.545 | 55.930 | plastic | 1.781 |
| | image-side surface 62 | -1.019 | 0.057 | | | | |
| fifth lens element 7 | object-side surface 71 | -1.080 | 0.368 | 1.637 | 23.231 | plastic | -2.323 |
| | image-side surface 72 | -4.425 | 0.070 | | | | |
| optical filter 8 | object-side surface 81 | ∞ | 0.455 | | | | |
| | image-side surface 82 | ∞ | 0.542 | | | | |
| image plane 9 | | ∞ | 0.000 | | | | |

FIG.19

| surface | 31 | 32 | 41 | 42 | 51 |
|---|---|---|---|---|---|
| K | -4.819E+01 | -7.253E-01 | -2.150E+01 | -1.099E+01 | 7.116E+01 |
| a4 | -3.993E-02 | -2.641E-01 | 2.330E-02 | 1.453E-01 | -3.345E-03 |
| a6 | -7.700E-03 | -1.948E-01 | 2.934E-01 | -2.475E-01 | -1.033E+00 |
| a8 | -2.841E-03 | 7.593E-02 | -2.085E-01 | 2.204E+00 | 5.347E+00 |
| a10 | -8.118E-04 | -2.108E-01 | 9.100E-02 | 1.309E+01 | -1.259E+01 |
| a12 | | -6.187E-02 | | -3.274E+01 | 8.937E+00 |
| surface | 52 | 61 | 62 | 71 | 72 |
| K | -1.405E-01 | -1.143E+02 | -1.381E-01 | -3.784E-02 | 0.000E+00 |
| a4 | 6.077E-02 | -7.999E-02 | 8.513E-02 | 1.366E-01 | 2.027E-01 |
| a6 | 8.939E-02 | 6.113E-02 | 2.129E-01 | 1.753E-01 | -9.079E-02 |
| a8 | -1.045E-01 | -1.366E-02 | 7.902E-02 | 2.826E-02 | 1.130E-03 |
| a10 | 1.944E-01 | 5.271E-03 | 9.012E-03 | 1.418E-03 | -5.647E-03 |
| a12 | | | | | -1.800E-03 |

FIG.20

| system focal length =1.044mm, half field-of-view =60.0°, F-number =2.78, system length =4.991mm ||||||||
|---|---|---|---|---|---|---|---|
| lens element | surface | | radius of curvature | thickness | refractive index | Abbe number | material | focal length |
| object | | | ∞ | ∞ | | | | |
| first lens element 3 | object-side surface 31 | 5.911 | 0.400 | 1.532 | 56.064 | plastic | -1.534 |
| | image-side surface 32 | 0.702 | 0.337 | | | | |
| second lens element 4 | object-side surface 41 | 3.068 | 0.751 | 1.637 | 23.231 | plastic | 2.397 |
| | image-side surface 42 | -2.795 | 0.100 | | | | |
| aperture stop 2 | | ∞ | 0.425 | | | | |
| third lens element 5 | object-side surface 51 | -7.797 | 0.884 | 1.545 | 55.930 | plastic | 1.693 |
| | image-side surface 52 | -0.860 | 0.050 | | | | |
| fourth lens element 6 | object-side surface 61 | 16.891 | 0.600 | 1.545 | 55.930 | plastic | 1.779 |
| | image-side surface 62 | -1.019 | 0.057 | | | | |
| fifth lens element 7 | object-side surface 71 | -1.080 | 0.220 | 1.637 | 23.231 | plastic | -2.282 |
| | image-side surface 72 | -4.425 | 0.070 | | | | |
| optical filter 8 | object-side surface 81 | ∞ | 0.455 | | | | |
| | image-side surface 82 | ∞ | 0.642 | | | | |
| image plane 9 | | ∞ | 0.000 | | | | |

FIG.23

| surface | 31 | 32 | 41 | 42 | 51 |
|---|---|---|---|---|---|
| K | -4.819E+01 | -7.253E-01 | -2.150E+01 | -1.099E+01 | 7.116E+01 |
| a4 | -3.993E-02 | -2.641E-01 | 2.330E-02 | 1.453E-01 | -3.345E-03 |
| a6 | -7.700E-03 | -1.948E-01 | 2.934E-01 | -2.475E-01 | -1.033E+00 |
| a8 | -2.841E-03 | 7.593E-02 | -2.085E-01 | 2.204E+00 | 5.347E+00 |
| a10 | -8.118E-04 | -2.108E-01 | 9.100E-02 | 1.309E+01 | -1.259E+01 |
| a12 |  | -6.187E-02 |  | -3.274E+01 | 8.937E+00 |
| surface | 52 | 61 | 62 | 71 | 72 |
| K | -1.405E-01 | -1.143E+02 | -1.381E-01 | -3.784E-02 | 0.000E+00 |
| a4 | 6.077E-02 | -7.999E-02 | 8.513E-02 | 1.366E-01 | 2.027E-01 |
| a6 | 8.939E-02 | 6.113E-02 | 2.129E-01 | 1.753E-01 | -9.079E-02 |
| a8 | -1.045E-01 | -1.366E-02 | 7.902E-02 | 2.826E-02 | 1.130E-02 |
| a10 | 1.944E-01 | 5.271E-03 | 9.012E-03 | 1.418E-03 | -5.647E-03 |
| a12 |  |  |  |  | -1.800E-03 |

| lens element | surface | radius of curvature | thickness | refractive index | Abbe number | material | focal length |
|---|---|---|---|---|---|---|---|
| \multicolumn{8}{|l|}{system focal length =1.095mm, half field-of-view =60.0°, F-number =2.78, system length =4.795mm} |
| object | | ∞ | ∞ | | | | |
| first lens element 3 | object-side surface 31 | 2.719 | 0.250 | 1.532 | 56.064 | plastic | -1.635 |
| | image-side surface 32 | 0.640 | 0.454 | | | | |
| second lens element 4 | object-side surface 41 | 3.105 | 0.801 | 1.585 | 29.909 | plastic | 2.542 |
| | image-side surface 42 | -2.615 | 0.100 | | | | |
| aperture stop 2 | | ∞ | 0.476 | | | | |
| third lens element 5 | object-side surface 51 | -5.508 | 0.565 | 1.545 | 55.930 | plastic | 1.743 |
| | image-side surface 52 | -0.842 | 0.050 | | | | |
| fourth lens element 6 | object-side surface 61 | 19.942 | 0.583 | 1.545 | 55.930 | plastic | 1.772 |
| | image-side surface 62 | -1.008 | 0.057 | | | | |
| fifth lens element 7 | object-side surface 71 | -1.064 | 0.230 | 1.643 | 22.437 | plastic | -1.999 |
| | image-side surface 72 | -6.459 | 0.070 | | | | |
| optical filter 8 | object-side surface 81 | ∞ | 0.455 | | | | |
| | image-side surface 82 | ∞ | 0.704 | | | | |
| image plane 9 | | ∞ | 0.000 | | | | |

| surface | 31 | 32 | 41 | 42 | 51 |
|---|---|---|---|---|---|
| K | -6.902E+00 | -6.446E-01 | -4.395E+01 | -5.353E+00 | 6.072E+01 |
| a4 | -1.786E-02 | -1.468E-01 | -1.095E-02 | 1.148E-01 | 1.570E-02 |
| a6 | -1.803E-03 | -3.062E-01 | 3.035E-01 | -3.815E-01 | -1.117E+00 |
| a8 | -3.618E-03 | 1.890E-01 | -2.172E-01 | 1.967E+00 | 5.536E+00 |
| a10 | -5.299E-03 | 1.179E-01 | 3.088E-01 | 1.790E+01 | -1.158E+01 |
| a12 | | 3.553E-01 | 5.543E-01 | -7.907E+01 | 1.040E+01 |
| surface | 52 | 61 | 62 | 71 | 72 |
| K | -1.655E-01 | 1.493E+02 | -1.617E-01 | -7.489E-02 | 0.000E+00 |
| a4 | 4.907E-02 | -6.172E-02 | 5.620E-02 | 1.311E-01 | 2.239E-01 |
| a6 | 1.092E-01 | 7.623E-02 | 2.166E-01 | 1.799E-01 | -1.084E-01 |
| a8 | -1.567E-01 | -3.526E-03 | 8.509E-02 | 2.302E-02 | 8.466E-03 |
| a10 | 2.372E-01 | 8.338E-04 | 8.139E-04 | -1.801E-02 | -6.962E-03 |
| a12 | 2.923E-01 | -5.658E-03 | | | 1.775E-03 |

| relationship | first preferred embodiment | second preferred embodiment | third preferred embodiment | fourth preferred embodiment | fifth preferred embodiment | sixth preferred embodiment | seventh preferred embodiment |
|---|---|---|---|---|---|---|---|
| T1 | 0.481 | 0.43 | 0.27 | 0.27 | 0.4 | 0.4 | 0.25 |
| G12 | 0.507 | 0.688 | 0.686 | 0.835 | 0.337 | 0.337 | 0.454 |
| T2 | 0.659 | 0.682 | 0.664 | 0.653 | 0.751 | 0.751 | 0.801 |
| T3 | 0.72 | 0.691 | 0.721 | 0.945 | 0.884 | 0.884 | 0.565 |
| T4 | 0.755 | 0.596 | 0.431 | 0.392 | 0.658 | 0.6 | 0.583 |
| T5 | 0.283 | 0.601 | 0.497 | 0.41 | 0.368 | 0.22 | 0.23 |
| CTmax | 0.755 | 0.691 | 0.721 | 0.945 | 0.884 | 0.884 | 0.801 |
| CTmin | 0.283 | 0.43 | 0.27 | 0.27 | 0.368 | 0.22 | 0.23 |
| BFL | 1.144 | 0.928 | 1.101 | 1.013 | 1.067 | 1.167 | 1.229 |
| EFL | 1.069 | 1.028 | 0.938 | 1.018 | 1.059 | 1.044 | 1.095 |
| TTL | 5.075 | 5.216 | 5.182 | 5.169 | 5.097 | 4.991 | 4.795 |
| T4/T1 | 1.570 | 1.386 | 1.596 | 1.452 | 1.645 | 1.500 | 2.332 |
| BFL/CTmin | 4.042 | 2.158 | 4.078 | 3.752 | 2.899 | 5.305 | 5.343 |
| CTmax/G12 | 1.489 | 1.004 | 1.051 | 1.132 | 2.623 | 2.623 | 1.764 |
| EFL/T1 | 2.222 | 2.391 | 3.474 | 3.770 | 2.648 | 2.610 | 4.380 |
| CTmax/T5 | 2.668 | 1.150 | 1.451 | 2.305 | 2.402 | 4.018 | 3.483 |
| EFL/T5 | 3.777 | 1.710 | 1.887 | 2.483 | 2.878 | 4.745 | 4.761 |
| T2/T3 | 0.915 | 0.987 | 0.921 | 0.691 | 0.850 | 0.850 | 1.418 |
| T4/G12 | 1.489 | 1.544 | 0.628 | 0.469 | 1.953 | 1.780 | 1.284 |
| BFL/T5 | 4.042 | 0.992 | 2.215 | 2.471 | 2.899 | 5.305 | 5.343 |
| T4/T5 | 2.668 | 0.992 | 0.867 | 0.956 | 1.788 | 2.727 | 2.535 |
| BFL/G12 | 2.256 | 1.349 | 1.605 | 1.213 | 3.166 | 3.463 | 2.707 |
| BFL/T4 | 1.515 | 1.557 | 2.555 | 2.584 | 1.622 | 1.945 | 2.108 |

IMAGING LENS, AND ELECTRONIC APPARATUS INCLUDING THE SAME

CROSS-REFERENCE TO RELATED APPLICATION

This application claims priority to Taiwanese Application No. 102135348, filed on Sep. 30, 2013.

BACKGROUND OF THE INVENTION

1. Field of the Invention

The present invention relates to an imaging lens and an electronic apparatus including the same.

2. Description of the Related Art

In recent years, as use of portable electronic devices (e.g., mobile phones and digital cameras) becomes ubiquitous, much effort has been put into reducing dimensions of portable electronic devices. Moreover, as dimensions of charged coupled device (CCD) and complementary metal-oxide semiconductor (CMOS) based optical sensors are reduced, dimensions of imaging lenses for use with the optical sensors must be correspondingly reduced without significantly compromising optical performance.

Each of U.S. patent application publication nos. 20110316969, 20100254029, 20130107376, 20130057967, U.S. Pat. Nos. 8,345,323, 7,911,712, 7,746,572, and Japanese patent publication no. 2008-281760 discloses a conventional imaging lens that includes five lens elements, and that has a system length of over 10 mm. Particularly, the imaging lens disclosed in U.S. patent application publication no. 20110316969 has a system length of over 14 mm, which disfavors reducing thickness of portable electronic devices, such as mobile phones and digital cameras.

Reducing the system length of the imaging lens while maintaining satisfactory optical performance is always a goal in the industry.

SUMMARY OF THE INVENTION

Therefore, an object of the present invention is to provide an imaging lens having a shorter overall length while maintaining good optical performance.

According to one aspect of the present invention, an imaging lens comprises a first lens element, a second lens element, a third lens element, a fourth lens element and a fifth lens element arranged in order from an object side to an image side along an optical axis of the imaging lens. Each of the first lens element, the second lens element, the third lens element, the fourth lens element and the fifth lens element has a refractive power, an object-side surface facing toward the object side and an image-side surface facing toward the image side.

The first lens element has a negative refractive power.

The second lens element has a positive refractive power. The object-side surface of the second lens element has a convex portion in a vicinity of a periphery of the second lens element.

The object-side surface of the third lens element has a concave portion in a vicinity of a periphery of the third lens element, and the image-side surface of the third lens element has a convex portion in a vicinity of a periphery of the third lens element.

The image-side surface of the fourth lens element has a convex portion in a vicinity of the optical axis.

The object-side surface of the fifth lens element has a concave portion in a vicinity of the optical axis, and the fifth lens element is made of a plastic material.

The imaging lens does not include any lens element with refractive power other than the first lens element, the second lens element, the third lens element, the fourth lens element and the fifth lens element.

Another object of the present invention is to provide an electronic apparatus having an imaging lens with five lens elements.

According to another aspect of the present invention, an electronic apparatus includes a housing and an imaging module. The imaging module is disposed in the housing, and includes the imaging lens of the present invention, a barrel on which the imaging lens is disposed, a holder unit on which the barrel is disposed, and an image sensor disposed at the image side of the imaging lens.

BRIEF DESCRIPTION OF THE DRAWINGS

Other features and advantages of the present invention will become apparent in the following detailed description of the preferred embodiments with reference to the accompanying drawings, of which:

FIG. 3 shows values of some optical parameters corresponding to the imaging lens of the first preferred embodiment;

FIG. 4 shows values of some parameters of an optical relationship corresponding to the imaging lens of the first preferred embodiment;

FIG. 7 shows values of some optical parameters corresponding to the imaging lens of the second preferred embodiment;

FIG. 8 shows values of some parameters of an optical relationship corresponding to the imaging lens of the second preferred embodiment;

FIG. 11 shows values of some optical parameters corresponding to the imaging lens of the third preferred embodiment;

FIG. 12 shows values of some parameters of an optical relationship corresponding to the imaging lens of the third preferred embodiment;

FIG. 15 shows values of some optical parameters corresponding to the imaging lens of the fourth preferred embodiment;

FIG. 16 shows values of some parameters of an optical relationship corresponding to the imaging lens of the fourth preferred embodiment;

FIG. 19 shows values of some optical parameters corresponding to the imaging lens of the fifth preferred embodiment;

FIG. 20 shows values of some parameters of an optical relationship corresponding to the imaging lens of the fifth preferred embodiment;

FIG. 23 shows values of some optical parameters corresponding to the imaging lens of the sixth preferred embodiment;

FIG. 24 shows values of some parameters of an optical relationship corresponding to the imaging lens of the sixth preferred embodiment;

FIG. 27 shows values of some optical parameters corresponding to the imaging lens of the seventh preferred embodiment;

FIG. 28 shows values of some parameters of an optical relationship corresponding to the imaging lens of the seventh preferred embodiment;

FIG. 30 is a table that lists values of parameters of other optical relationships corresponding to the imaging lenses of the first to seventh preferred embodiments;

DETAILED DESCRIPTION OF THE PREFERRED EMBODIMENTS

Figure 1:
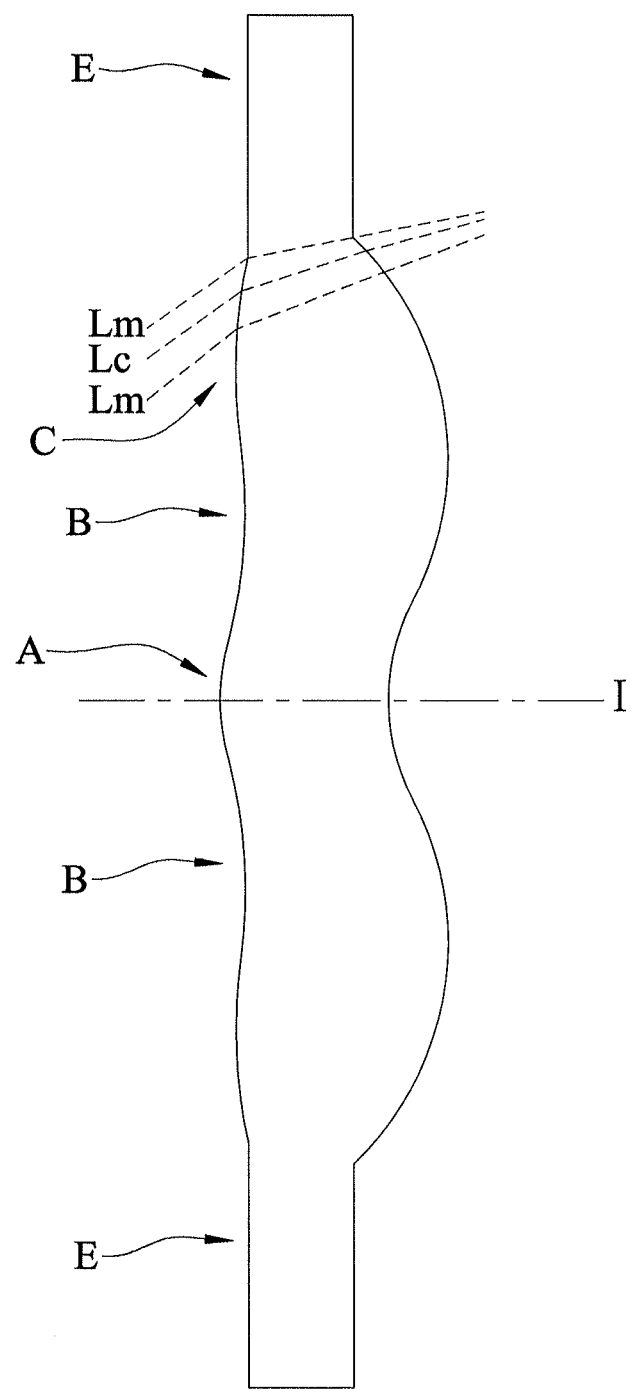
FIG. 1 is a schematic diagram to illustrate the structure of a lens element.

Before the present invention is described in greater detail, it should be noted that like elements are denoted by the same reference numerals throughout the disclosure.

In the following description, "a lens element has a positive (or negative) refractive power" means the lens element has a positive (or negative) refractive power in a vicinity of an optical axis thereof. "An object-side surface (or image-side surface) has a convex (or concave) portion at a certain area" means that, compared to a radially exterior area adjacent to said certain area, said certain area is more convex (or concave) in a direction parallel to the optical axis. Referring to FIG. 1 as an example, the lens element is radially symmetrical with respect to an optical axis (I) thereof. The object-side surface of the lens element has a convex portion at an area A, a concave portion at an area B, and a convex portion at an area C. This is because the area A is more convex in a direction parallel to the optical axis (I) in comparison with a radially exterior area thereof (i.e., area B), the area B is more concave in comparison with the area C, and the area C is more convex in comparison with an area E. "In a vicinity of a periphery" refers to an area around a periphery of a curved surface of the lens element for passage of imaging light only, which is the area C in FIG. 1. The imaging light includes a chief ray Lc and a marginal ray Lm. "In a vicinity of the optical axis" refers to an area around the optical axis of the curved surface for passage of the imaging light only, which is the area A in FIG. 1. In addition, the lens element further includes an extending portion E for installation into an optical imaging lens device. Ideally, the imaging light does not pass through the extending portion E. The structure and shape of the extending portion E are not limited herein. In the following embodiments, the extending portion E is not depicted in the drawings for the sake of clarity.

Figure 2:
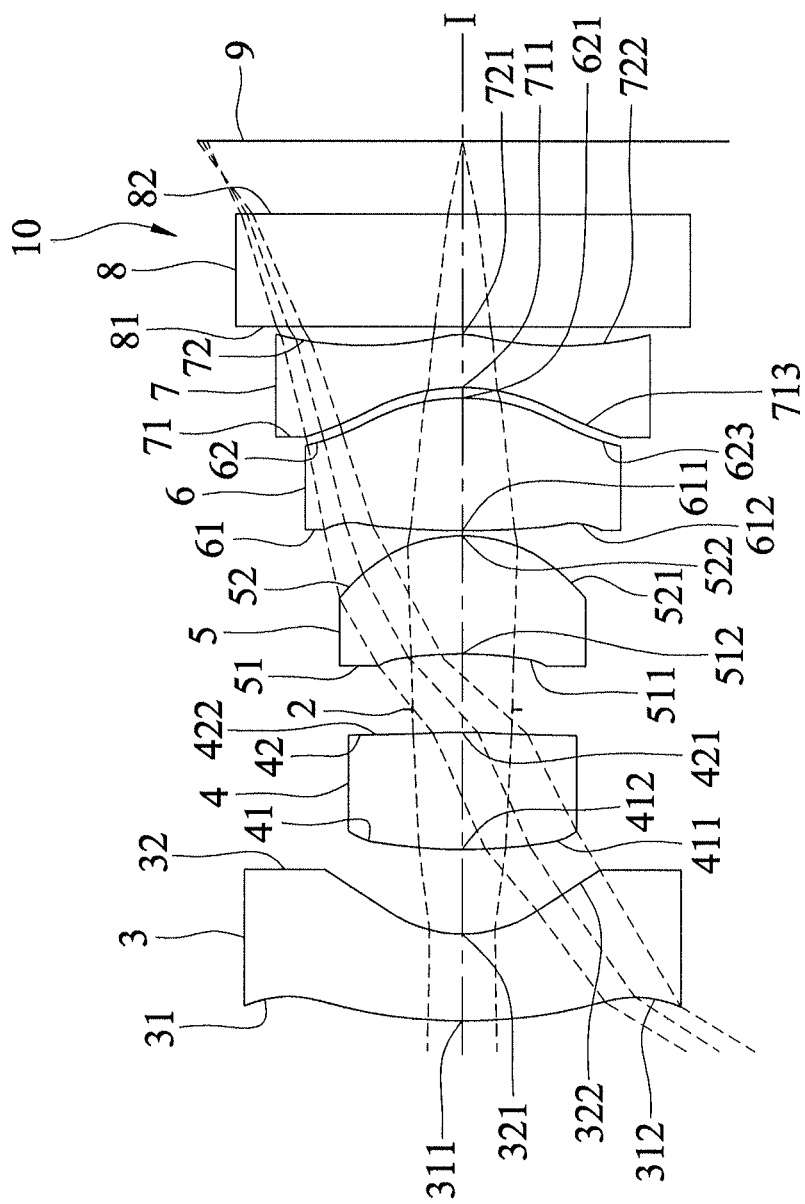
FIG. 2 is a schematic diagram that illustrates the first preferred embodiment of an imaging lens according to the present invention.

Referring to FIG. 2, the first preferred embodiment of an imaging lens 10 according to the present invention includes a first lens element 3, a second lens element 4, an aperture stop 2, a third lens element 5, a fourth lens element 6, a fifth lens elements 7, and an optical filter 8 arranged in the given order along an optical axis (I) from an object side to an image side. The optical filter 8 is an infrared cut filter for selectively absorbing infrared light to thereby reduce imperfection of images formed at an image plane 9.

Each of the first, second, third, fourth and fifth lens elements 3-7 and the optical filter 8 has an object-side surface 31, 41, 51, 61, 71, 81 facing toward the object side, and an image-side surface 32, 42, 52, 62, 72, 82 facing toward the image side. Light entering the imaging lens 10 travels through the object-side and image-side surfaces 31, 32 of the first lens element 3, the object-side and image-side surfaces 41, 42 of the second lens element 4, the aperture stop 2, the object-side and image-side surfaces 51, 52 of the third lens element 5, the object-side and image-side surfaces 61, 62 of the fourth lens element 6, the object-side and image-side surfaces 71, 72 of the fifth lens element 7, and the object-side and image-side surfaces 81, 82 of the optical filter 8, in the given order, to form an image on the image plane 9. Each of the object-side surfaces 31, 41, 51, 61, 71 and the image-side surfaces 32, 42, 52, 62, 72 is aspherical and has a center point coinciding with the optical axis (I).

The lens elements 3-7 are made of a plastic material in this embodiment, and at least one of the lens elements 3-6 may be made of other materials in other embodiments. In addition, each of the lens elements 3-7 has a refractive power.

In the first preferred embodiment, which is depicted in FIG. 2, the first lens element 3 has a negative refractive power. The object-side surface 31 of the first lens element 3 has a convex portion 311 in a vicinity of the optical axis (I), and a concave portion 312 in a vicinity of a periphery of the first lens element 3. The image-side surface 32 of the first lens element 3 is a concave surface that has a concave portion 321 in a vicinity of the optical axis (I), and a concave portion 322 in a vicinity of the periphery of the first lens element 3.

The second lens element 4 has a positive refractive power. The object-side surface 41 of the second lens element 4 is a convex surface that has a convex portion 412 in a vicinity of the optical axis (I), and a convex portion 411 in a vicinity of a periphery of the second lens element 4. The image-side surface 42 of the second lens element 4 is a convex surface that has a convex portion 421 in a vicinity of the optical axis (I), and a convex portion 422 in a vicinity of the periphery of the second lens element 4.

The third lens element 5 has a positive refractive power. The object-side surface 51 of the third lens element 5 is a concave surface that has a concave portion 512 in a vicinity of the optical axis (I), and a concave portion 511 in a vicinity of a periphery of the third lens element 5. The image-side surface 52 of the third lens element 5 is a convex surface that has a convex portion 522 in a vicinity of the optical axis (I), and a convex portion 521 in a vicinity of the periphery of the third lens element 5.

The fourth lens element 6 has a positive refractive power. The object-side surface 61 of the fourth lens element 6 has a convex portion 611 in a vicinity of the optical axis (I), and a concave portion 612 in a vicinity of a periphery of the fourth lens element 6. The image-side surface 62 of the fourth lens element 6 is a convex surface that has a convex portion 621 in a vicinity of the optical axis (I), and a convex portion 623 in a vicinity of the periphery of the fourth lens element 6.

The fifth lens element 7 has a negative refractive power. The object-side surface 71 of the fifth lens element 7 is a concave surface that has a concave portion 711 in a vicinity of the optical axis (I), and a concave portion 713 in a vicinity of a periphery of the fifth lens element 7. The image-side surface 72 of the fifth lens element 7 has a convex portion 721 in a vicinity of the optical axis (I), and a concave portion 722 in a vicinity of the periphery of the fifth lens element 7.

In the first preferred embodiment, the imaging lens 10 does not include any lens element with refractive power other than the aforesaid lens elements 3-7.

Shown in FIG. 3 is a table that lists values of some optical parameters corresponding to the surfaces 31-81, 32-82 of the first preferred embodiment. The imaging lens 10 has an overall system effective focal length (EFL) of 1.069 mm, a half field-of-view (HFOV) of 60.0°, an F-number of 2.78, and a system length of 5.075 mm. The system length refers to a distance between the object-side surface 31 of the first lens element 3 and the image plane 9 at the optical axis (I).

In this embodiment, each of the object-side surfaces 31-71 and the image-side surfaces 32-72 is aspherical, and satisfies the optical relationship of $$Z(Y) = \frac{Y^2}{R} \Big/ \left(1 + \sqrt{1-(1+K)\frac{Y^2}{R^2}}\right) + \sum_{i=1}^{n} a_{2i} \times Y^{2i} \quad (1)$$

where:

R represents a radius of curvature of the aspherical surface;

Z represents a depth of an aspherical surface, which is defined as a perpendicular distance between an arbitrary point on the aspherical surface that is spaced apart from the optical axis (I) by a distance Y, and a tangent plane at a vertex of the aspherical surface at the optical axis (I);

Y represents a perpendicular distance between the arbitrary point on the aspherical surface and the optical axis (I);

K represents a conic constant; and $a_{2i}$ represents a $2i^{th}$ aspherical coefficient.

Shown in FIG. 4 is a table that lists values of some optical parameters of the aforementioned optical relationship (1) corresponding to the first preferred embodiment.

Relationships among some of the aforementioned optical parameters corresponding to the first preferred embodiment are as follows:

T1=0.481
G12=0.507
T2=0.659
T3=0.720
T4=0.755
T5=0.283
CTmax=0.755
CTmin=0.283
BFL=1.144
EFL=1.069
TTL=5.075
T4/T1=1.570
BFL/CTmin=4.042
CTmax/G12=1.489
EFL/T1=2.222
CTmax/T5=2.668
EFL/T5=3.777
T2/T3=0.915
T4/G12=1.489
BFL/T5=4.042
T4/T5=2.668
BFL/G12=2.256
BFL/T4=1.515 where:

T1 represents a thickness of the first lens element 3 at the optical axis (I);

T2 represents a thickness of the second lens element 4 at the optical axis (I);

T3 represents a thickness of the third lens element 5 at the optical axis (I);

T4 represents a thickness of the fourth lens element 6 at the optical axis (I);

T5 represents a thickness of the fifth lens element 7 at the optical axis (I);

G12 represents an air gap length between the first lens element 3 and the second lens element 4 at the optical axis (I);

CTmin represents a minimum among the thicknesses of the lens elements 3-7 at the optical axis (I);

CTmax represents a maximum among the thicknesses of the lens elements 3-7 at the optical axis (I);

TTL represents a distance between the object-side surface 31 of the first lens element 3 and the image plane 9 at the optical axis (I); and BFL represents a distance at the optical axis (I) between the image-side surface 72 of the fifth lens element 7 and the image plane 9.

FIGS. 5(a) to 5(d) respectively show simulation results corresponding to longitudinal spherical aberration, sagittal astigmatism aberration, tangential astigmatism aberration, and distortion aberration of the first preferred embodiment. In each of the simulation results, curves corresponding respectively to wavelengths of 450 nm, 555 nm, and 650 nm are shown.

Figure 5:
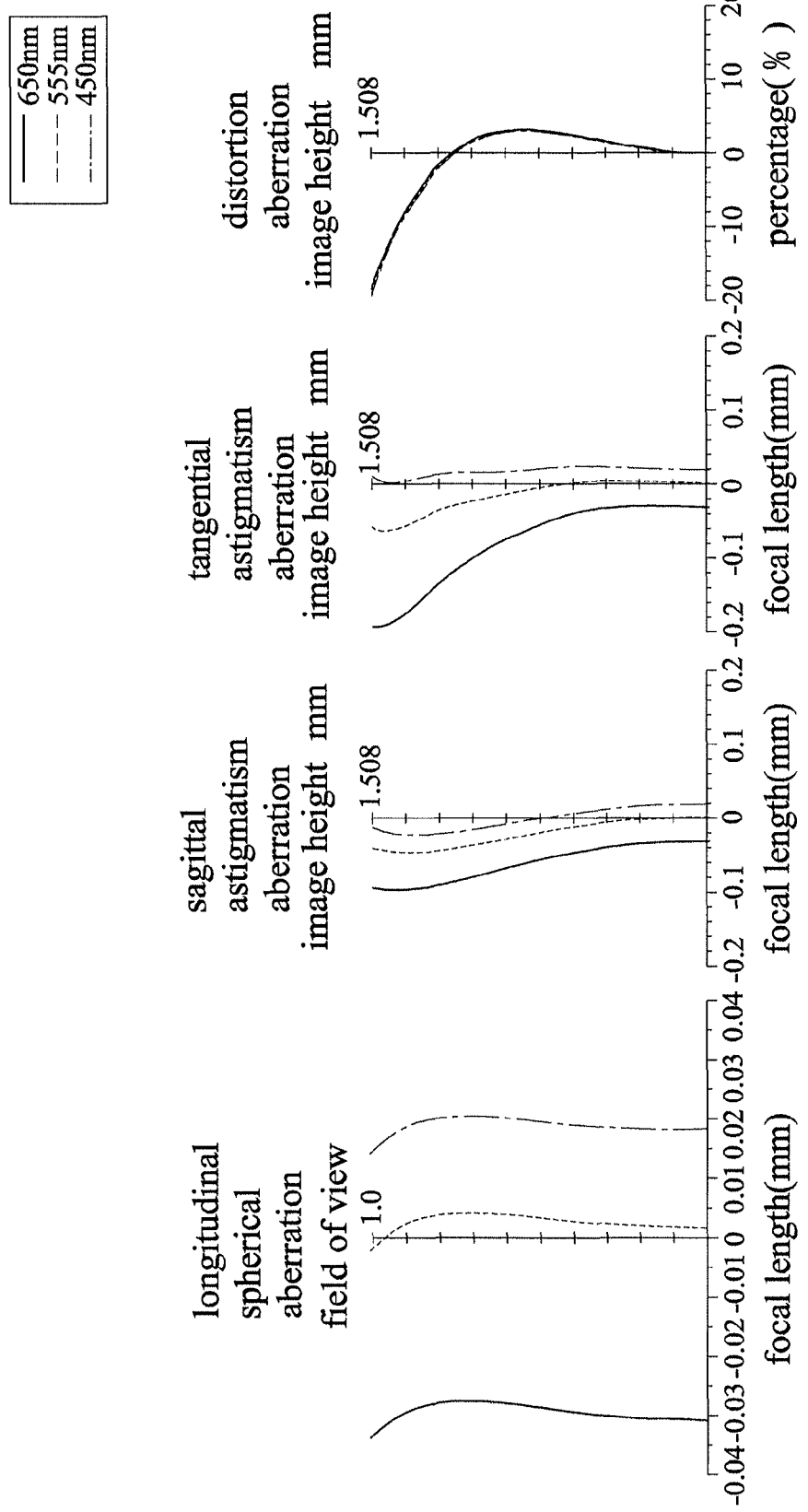
FIGS. 5(a) to 5(d) show different optical characteristics of the imaging lens of the first preferred embodiment.

It can be understood from FIG. 5(a) that, since each of the curves corresponding to longitudinal spherical aberration has a focal length at each field of view (indicated by the vertical axis) that falls within the range of ±0.05 mm, the first preferred embodiment is able to achieve a relatively low spherical aberration at each of the wavelengths. Furthermore, since a deviation in focal length among the curves at each field of view does not exceed the range of ±0.035 mm, the first preferred embodiment has a relatively low chromatic aberration.

It can be understood from FIGS. 5(b) and 5(c) that, since each of the curves falls within the range of ±0.2 mm of focal length, the first preferred embodiment has a relatively low optical aberration.

Moreover, as shown in FIG. 5(d), since each of the curves corresponding to distortion aberration falls within the range of ±20%, the first preferred embodiment is able to meet requirements in imaging quality of most optical systems.

In view of the above, even with the system length reduced down to 5.075 mm, the imaging lens 10 of the first preferred embodiment is still able to achieve a relatively good optical performance.

Figure 6:
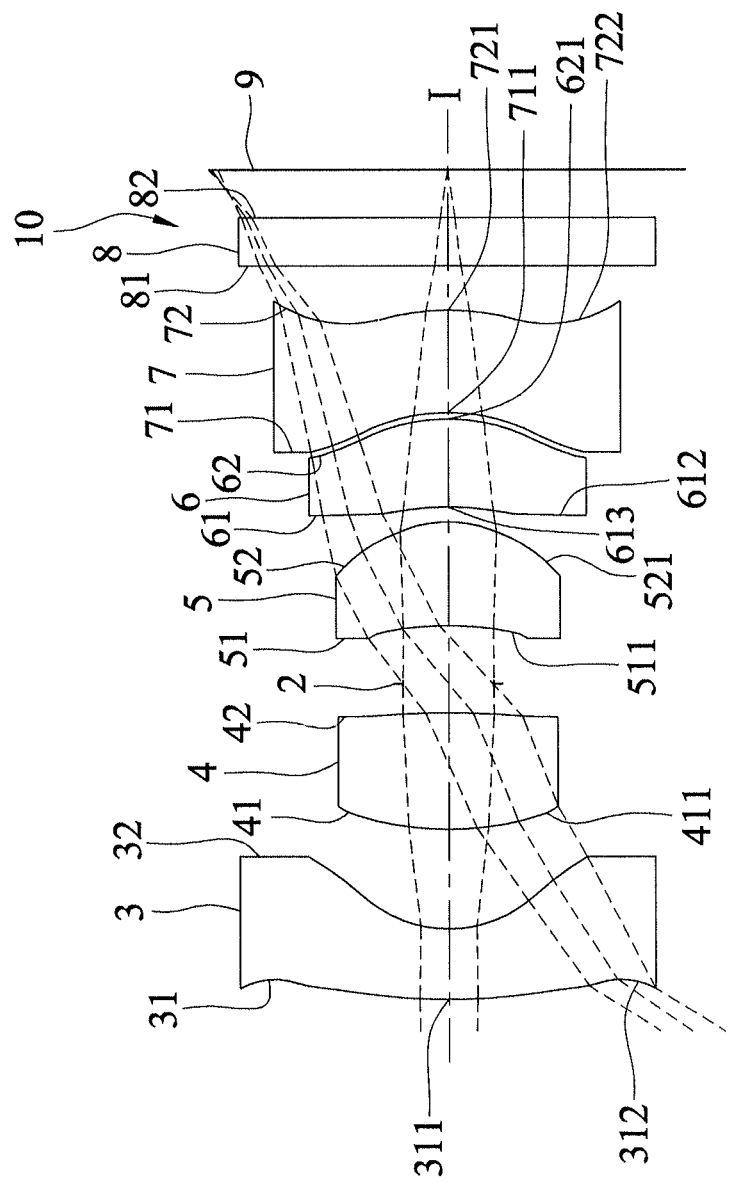
FIG. 6 is a schematic diagram that illustrates the second preferred embodiment of an imaging lens according to the present invention.

Referring to FIG. 6, the differences between the first and second preferred embodiments of the imaging lens 10 of this invention reside in that: the object-side surface 61 of the fourth lens element 6 is a concave surface that has a concave portion 613 in a vicinity of the optical axis (I), and a concave portion 612 in a vicinity of a periphery of the fourth lens element 6.

Shown in FIG. 7 is a table that lists values of some optical parameters corresponding to the surfaces 31-81, 32-82 of the second preferred embodiment. The imaging lens 10 has an overall system focal length of 1.028 mm, an HFOV of 58.0°, an F-number of 2.80, and a system length of 5.216 mm.

Shown in FIG. 8 is a table that lists values of some optical parameters of the aforementioned optical relationship (1) corresponding to the second preferred embodiment.

Relationships among some of the aforementioned optical parameters corresponding to the second preferred embodiment are as follows:

T1=0.430
G12=0.688
T2=0.682
T3=0.691
T4=0.596
T5=0.601
CTmax=0.691
CTmin=0.430
BFL=0.928
EFL=1.028
TTL=5.216
T4/T1=1.386
BFL/CTmin=2.158
CTmax/G12=1.004
EFL/T1=2.391
CTmax/T5=1.150
EFL/T5=1.710
T2/T3=0.987
T4/G12=0.866
BFL/T5=1.544
T4/T5=0.992
BFL/G12=1.349
BFL/T4=1.557

Figure 9:
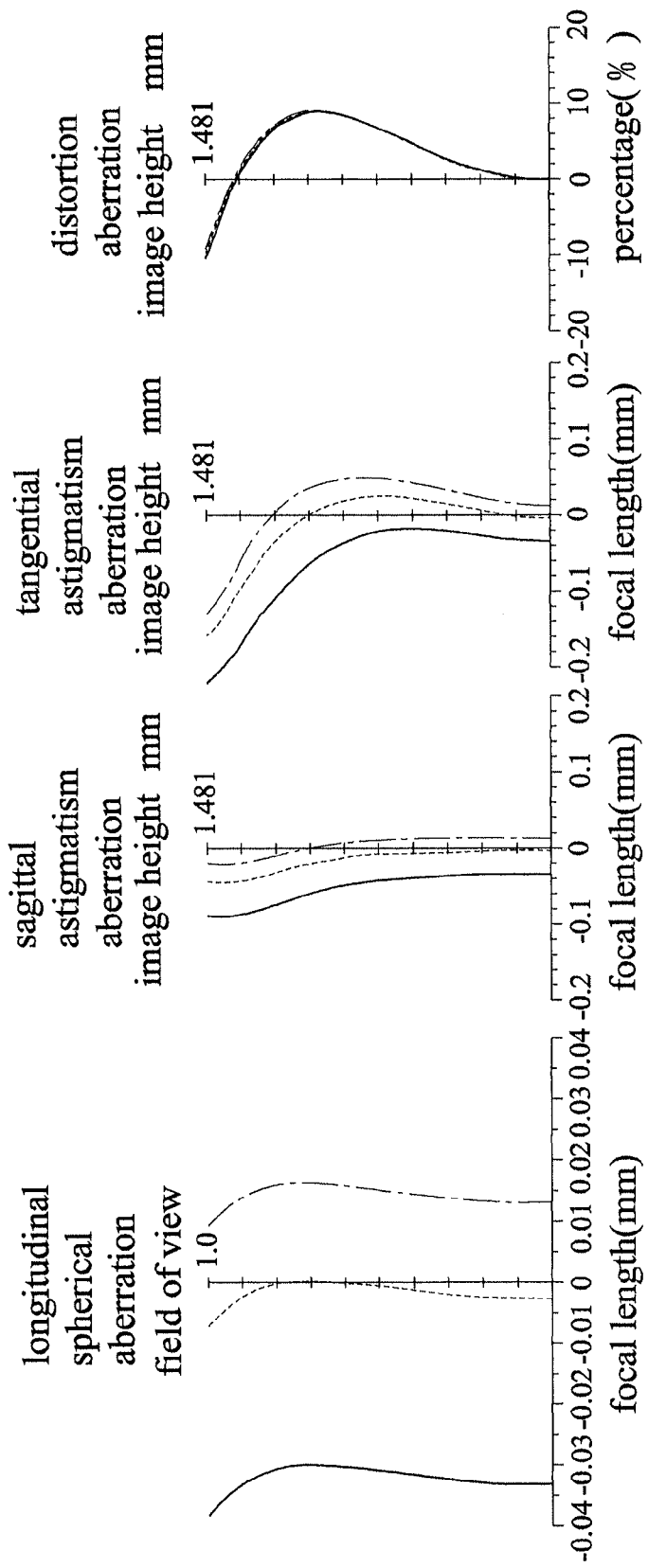
FIGS. 9(a) to 9(d) show different optical characteristics of the imaging lens of the second preferred embodiment.

FIGS. 9(*a*) to 9(*d*) respectively show simulation results corresponding to longitudinal spherical aberration, sagittal astigmatism aberration, tangential astigmatism aberration, and distortion aberration of the second preferred embodiment. It can be understood from FIGS. 9(*a*) to 9(*d*) that the second preferred embodiment is able to achieve a relatively good optical performance.

Figure 10:
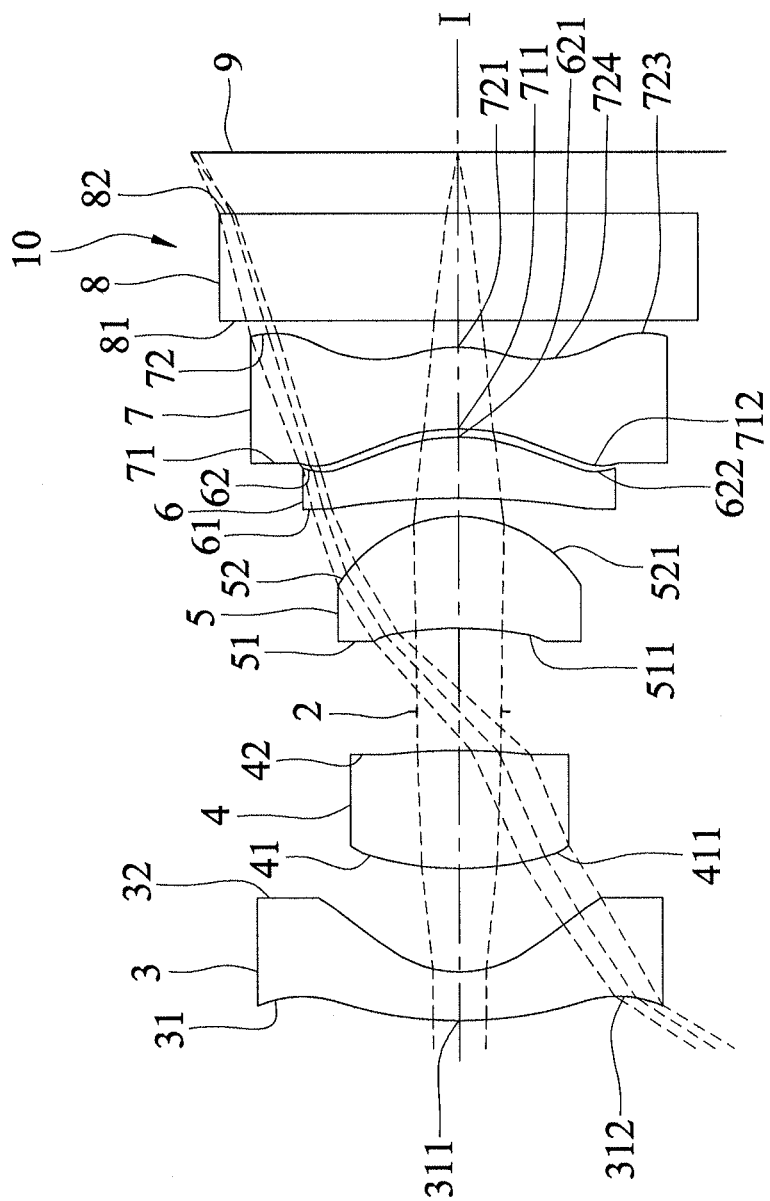
FIG. 10 is a schematic diagram that illustrates the third preferred embodiment of an imaging lens according to the present invention.

Referring to FIG. 10, the differences between the second and third preferred embodiments of the imaging lens 10 of this invention reside in that: the image-side surface 62 of the fourth lens element 6 has a convex portion 621 in a vicinity of the optical axis (I), and a concave portion 622 in a vicinity of a periphery of the fourth lens element 6; the object-side surface 71 of the fifth lens element 7 has a concave portion 711 in a vicinity of the optical axis (I), and a convex portion 712 in a vicinity of a periphery of the fifth lens element 7; and the image-side surface 72 of the fifth lens element 7 has a convex portion 721 in a vicinity of the optical axis (I), a convex portion 723 in a vicinity of the periphery of the fifth lens element 7, and a concave portion 724 between the convex portions 721 and 723.

Shown in FIG. 11 is a table that lists values of some optical parameters corresponding to the surfaces 31-81, 32-82 of the third preferred embodiment. The imaging lens 10 has an overall system focal length of 0.938 mm, an HFOV of 60.0°, an F-number of 2.80, and a system length of 5.182 mm.

Shown in FIG. 12 is a table that lists values of some optical parameters of the aforementioned optical relationship (1) corresponding to the third preferred embodiment.

Relationships among some of the aforementioned optical parameters corresponding to the third preferred embodiment are as follows:

T1=0.270
G12=0.686
T2=0.664
T3=0.721
T4=0.431
T5=0.497
CTmax=0.721
CTmin=0.270
BFL=1.101
EFL=0.938
TTL=5.182
T4/T1=1.596
BFL/CTmin=4.078
CTmax/G12=1.051
EFL/T1=3.474
CTmax/T5=1.451
EFL/T5=1.887
T2/T3=0.921
T4/G12=0.628
BFL/T5=2.215
T4/T5=0.867
BFL/G12=1.605
BFL/T4=2.555

Figure 13:
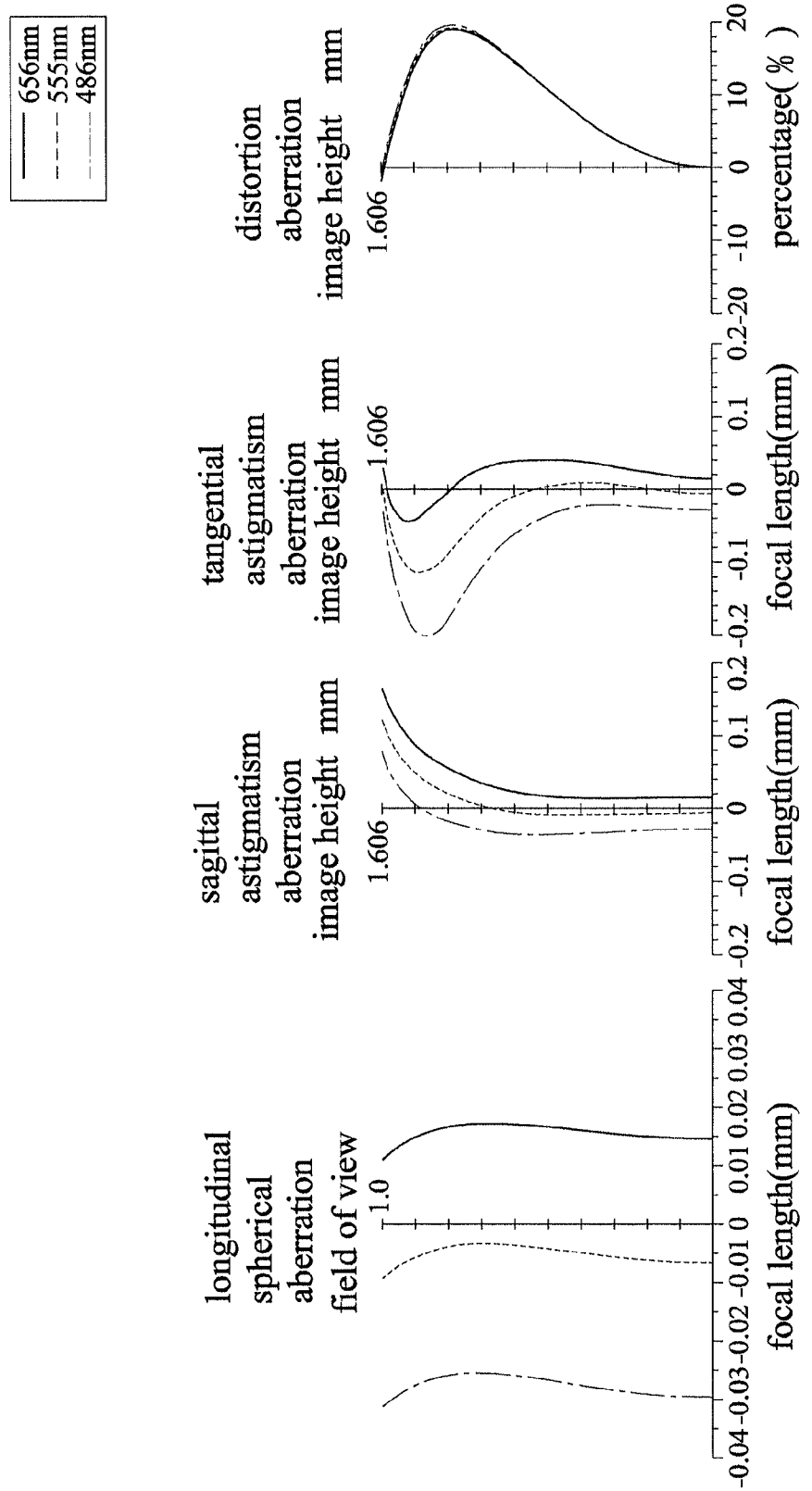
FIGS. 13(a) to 13(d) show different optical characteristics of the imaging lens of the third preferred embodiment.

FIGS. 13(*a*) to 13(*d*) respectively show simulation results corresponding to longitudinal spherical aberration, sagittal astigmatism aberration, tangential astigmatism aberration, and distortion aberration of the third preferred embodiment. It can be understood from FIGS. 13(*a*) to 13(*d*) that the third preferred embodiment is able to achieve a relatively good optical performance.

Figure 14:
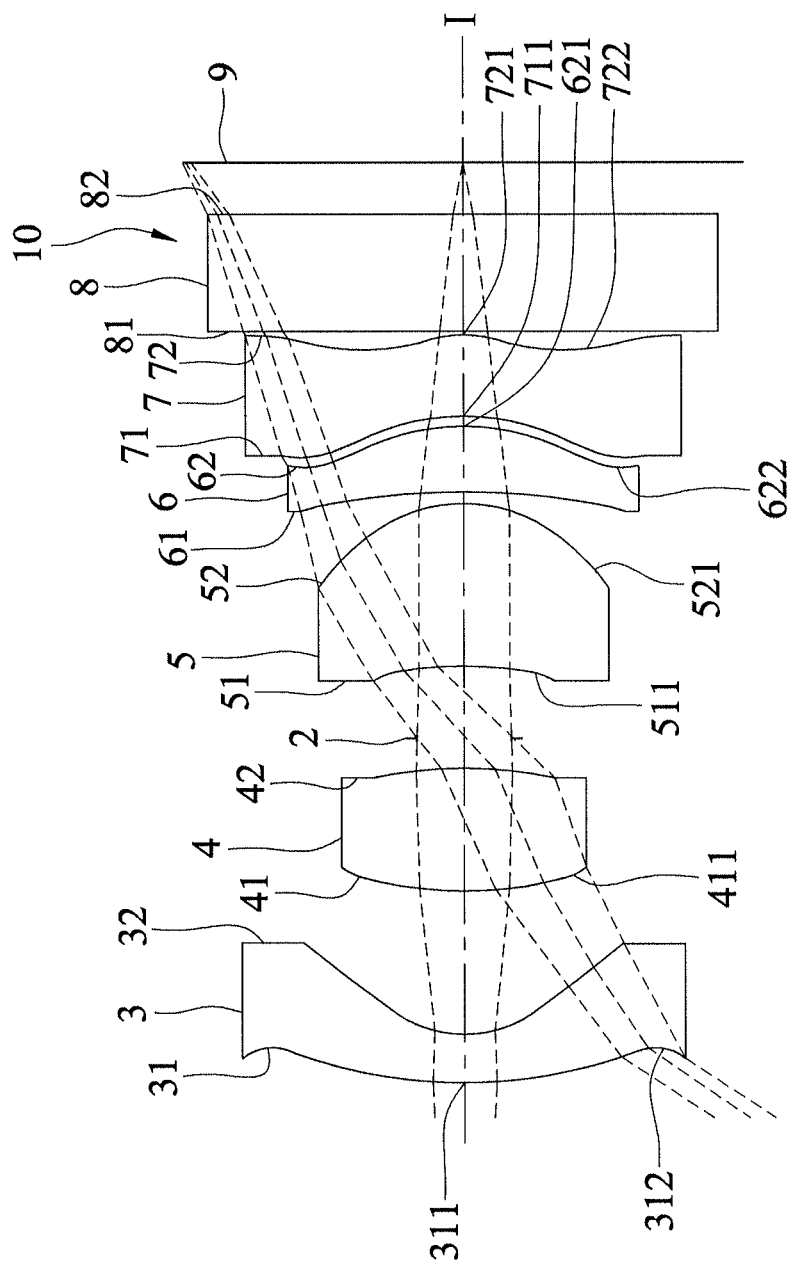
FIG. 14 is a schematic diagram that illustrates the fourth preferred embodiment of an imaging lens according to the present invention.
Figures 17A, 17B, 17C, 17D:
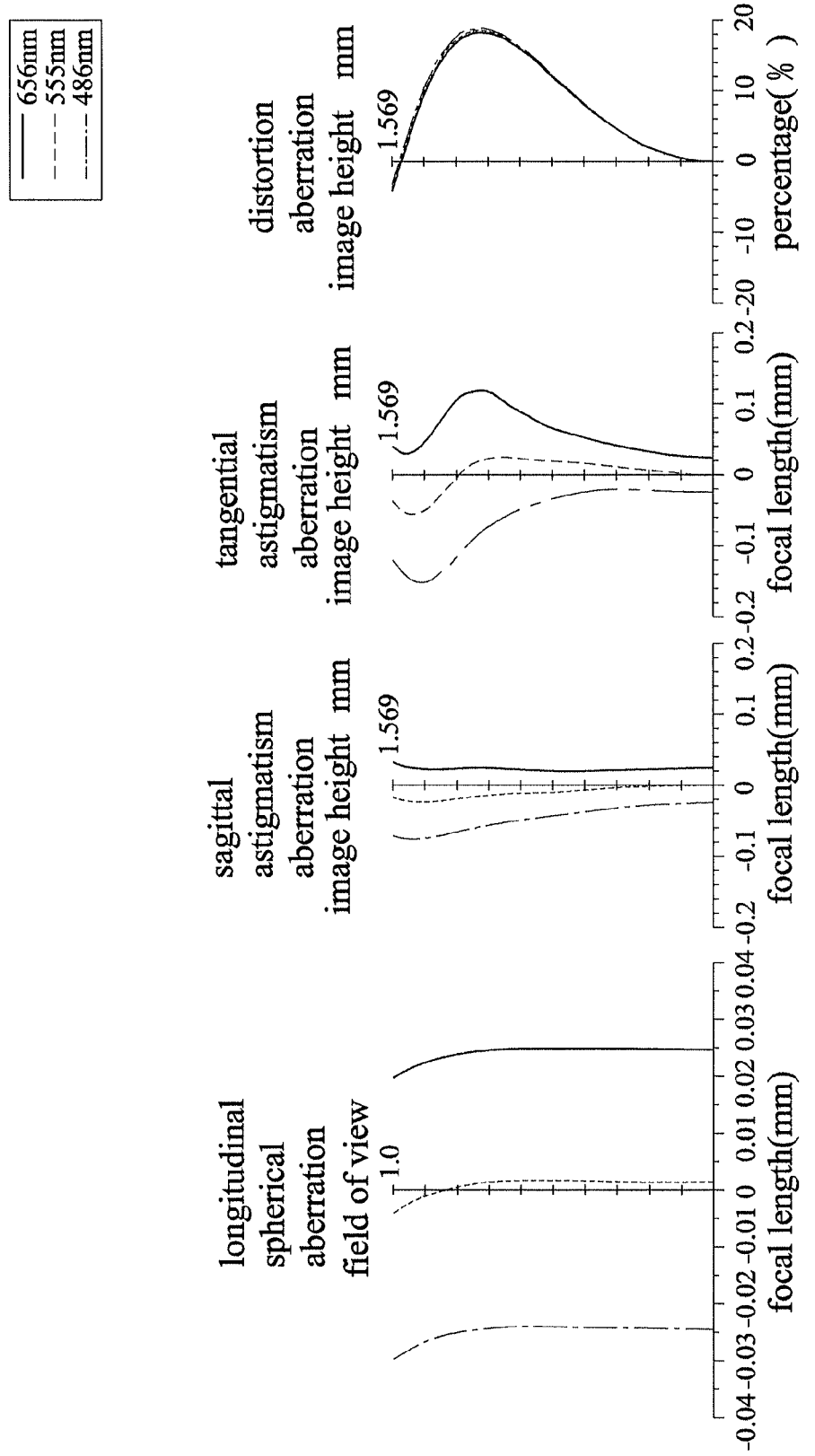
FIGS. 17(a) to 17(d) show different optical characteristics of the imaging lens of the fourth preferred embodiment.

Referring to FIG. 14, the differences between the third and fourth preferred embodiments of the imaging lens 10 of this invention reside in that: the image-side surface 72 of the fifth lens element 7 has a convex portion 721 in a vicinity of the optical axis (I), and a concave portion 722 in a vicinity of a periphery of the fifth lens element 7.

Shown in FIG. 15 is a table that lists values of some optical parameters corresponding to the surfaces 31-81, 32-82 of the fourth preferred embodiment. The imaging lens 10 has an overall system focal length of 1.018 mm, an HFOV of 58.0°, an F-number of 2.80, and a system length of 5.169 mm.

Shown in FIG. 16 is a table that lists values of some optical parameters of the aforementioned optical relationship (1) corresponding to the fourth preferred embodiment.

Relationships among some of the aforementioned optical parameters corresponding to the fourth preferred embodiment are as follows:

T1=0.270
G12=0.835
T2=0.653
T3=0.945
T4=0.392
T5=0.410
CTmax=0.945
CTmin=0.270
BFL=1.103
EFL=1.018
TTL=5.169
T4/T1=1.452
BFL/CTmin=3.752
CTmax/G12=1.132
EFL/T1=3.770
CTmax/T5=2.305
EFL/T5=2.483

T2/T3=0.691
T4/G12=0.469
BFL/T5=2.471
T4/T5=0.956
BFL/G12=1.213
BFL/T4=2.584

FIGS. 17(a) to 17(d) respectively show simulation results corresponding to longitudinal spherical aberration, sagittal astigmatism aberration, tangential astigmatism aberration, and distortion aberration of the fourth preferred embodiment. It can be understood from FIGS. 17(a) to 17(d) that the fourth preferred embodiment is able to achieve a relatively good optical performance.

Figure 18:
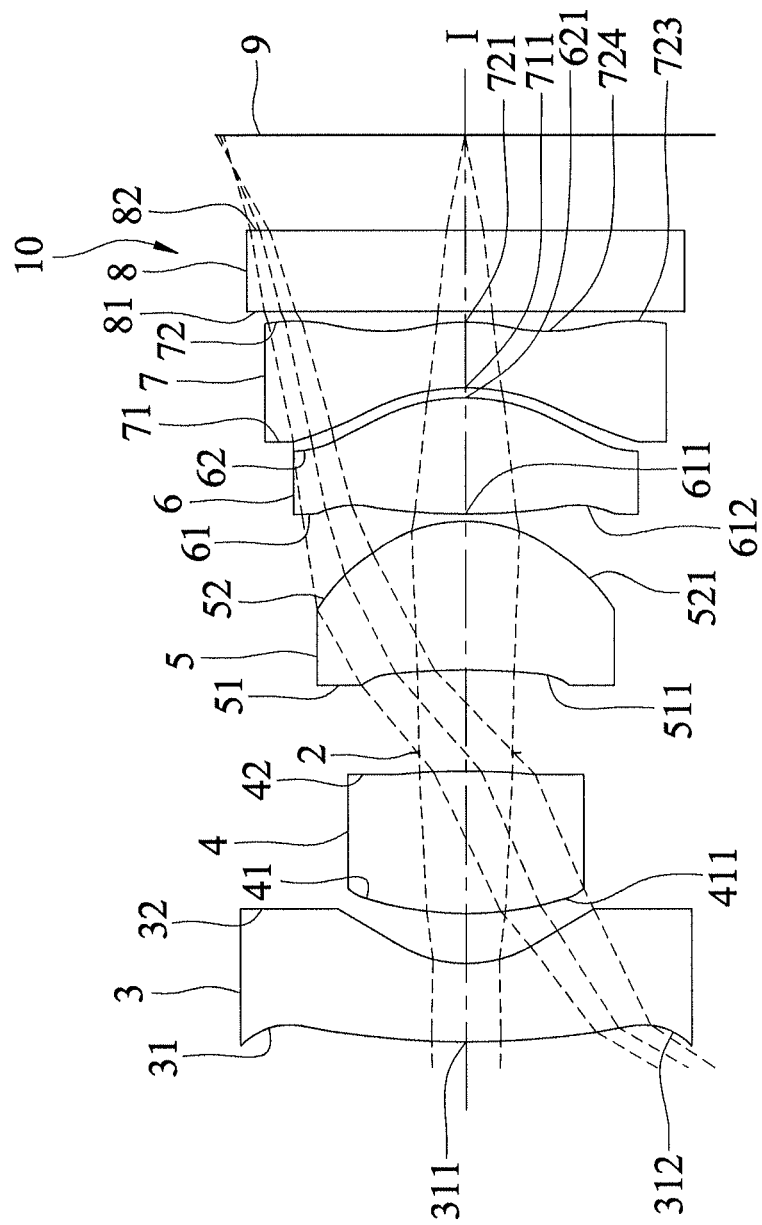
FIG. 18 is a schematic diagram that illustrates the fifth preferred embodiment of an imaging lens according to the present invention.
Figures 21A, 21B, 21C, 21D:
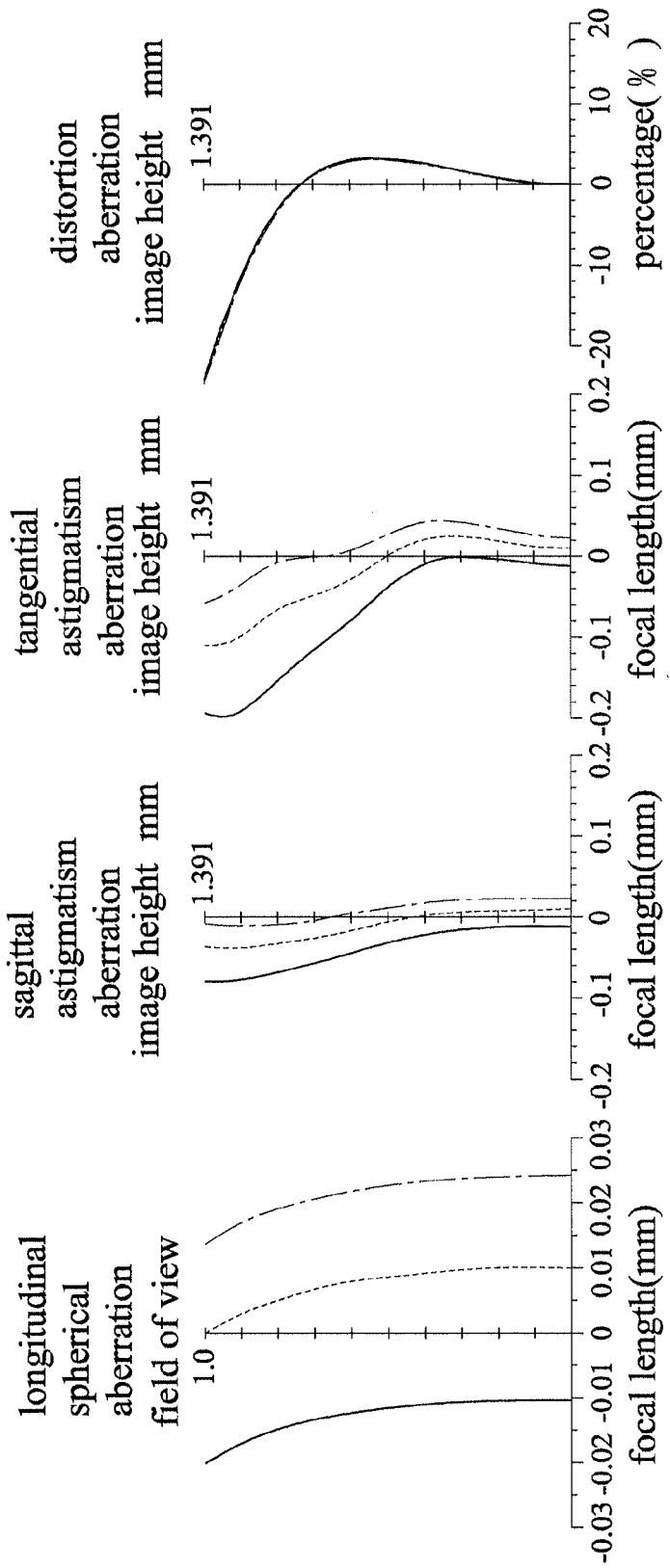
FIGS. 21(a) to 21(d) show different optical characteristics of the imaging lens of the fifth preferred embodiment.

Referring to FIG. 18, the differences between the first and fifth preferred embodiments of the imaging lens 10 of this invention reside in that: the image-side surface 72 of the fifth lens element 7 has a convex portion 721 in a vicinity of the optical axis (I), a convex portion 723 in a vicinity of a periphery of the fifth lens element 7, and a concave portion 724 between the convex portions 721 and 723.

Shown in FIG. 19 is a table that lists values of some optical parameters corresponding to the surfaces 31-81, 32-82 of the fifth preferred embodiment. The imaging lens 10 has an overall system focal length of 1.059 mm, an HFOV of 60.0°, an F-number of 2.78, and a system length of 5.097 mm.

Shown in FIG. 20 is a table that lists values of some optical parameters of the aforementioned optical relationship (1) corresponding to the fifth preferred embodiment.

Relationships among some of the aforementioned optical parameters corresponding to the fifth preferred embodiment are as follows:

T1=0.400
G12=0.337
T2=0.751
T3=0.884
T4=0.658
T5=0.368
CTmax=0.884
CTmin=0.368
BFL=1.067
EFL=1.059
TTL=5.097
T4/T1=1.645
BFL/CTmin=2.899
CTmax/G12=2.623
EFL/T1=2.648
CTmax/T5=2.402
EFL/T5=2.878
T2/T3=0.850
T4/G12=1.953
BFL/T5=2.899
T4/T5=1.788
BFL/G12=3.166
BFL/T4=1.622

FIGS. 21(a) to 21(d) respectively show simulation results corresponding to longitudinal spherical aberration, sagittal astigmatism aberration, tangential astigmatism aberration, and distortion aberration of the fifth preferred embodiment. It can be understood from FIGS. 21(a) 21(d) that the fifth preferred embodiment is able to achieve a relatively good optical performance.

Figure 22:
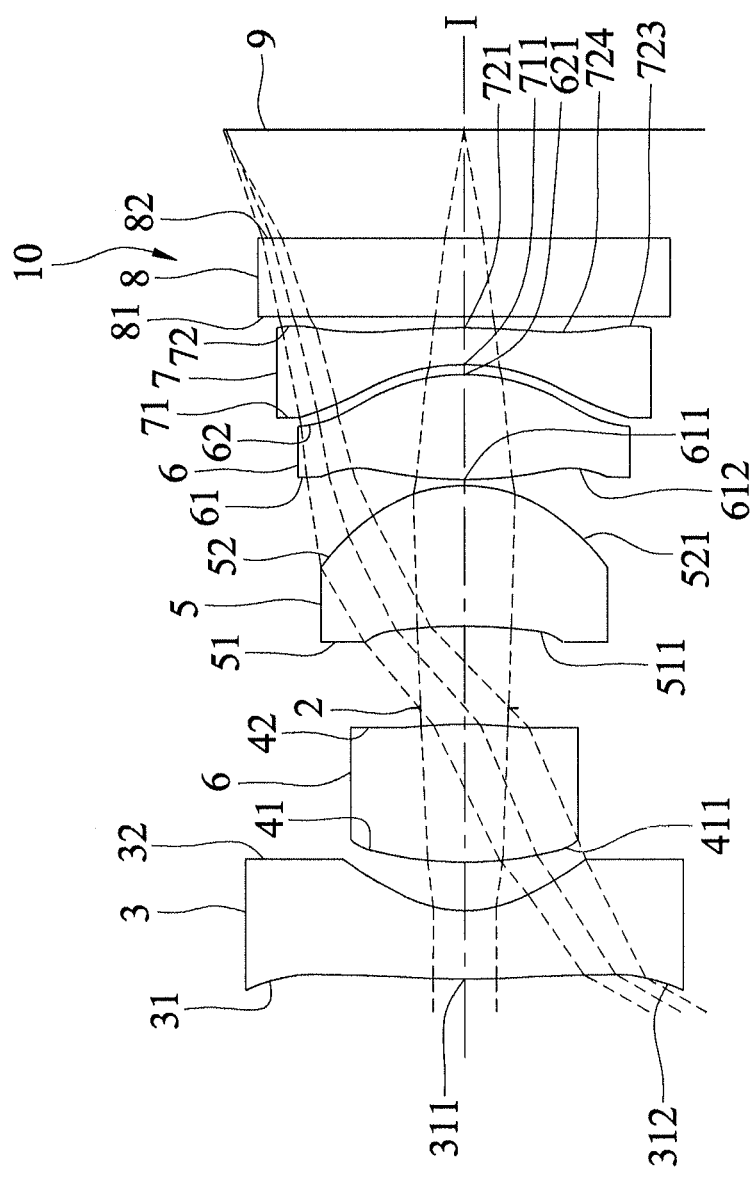
FIG. 22 is a schematic diagram that illustrates the sixth preferred embodiment of an imaging lens according to the present invention.
Figure 25:
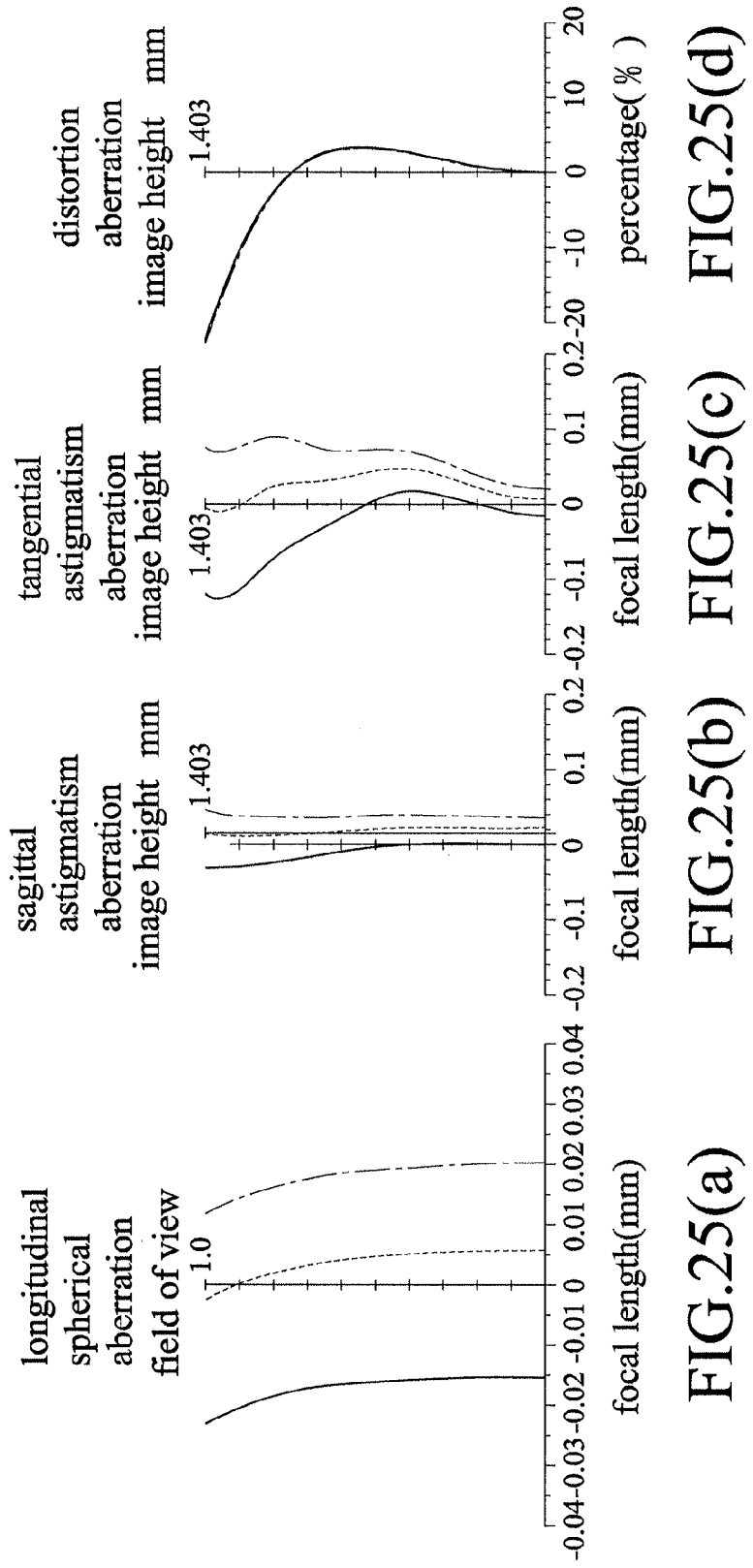
FIGS. 25(a) to 25(d) show different optical characteristics of the imaging lens of the sixth preferred embodiment.

FIG. 22 illustrates the sixth preferred embodiment of an imaging lens 10 according to the present invention, which has a configuration similar to that of the fifth preferred embodiment.

Shown in FIG. 23 is a table that lists values of some optical parameters corresponding to the surfaces 31-81, 32-82 of the sixth preferred embodiment. The imaging lens 10 has an overall system focal length of 1.044 mm, an HFOV of 60.0°, an F-number of 2.78, and a system length of 4.991 mm.

Shown in FIG. 24 is a table that lists values of some optical parameters of the aforementioned optical relationship (1) corresponding to the sixth preferred embodiment.

Relationships among some of the aforementioned optical parameters corresponding to the sixth preferred embodiment are as follows:

T1=0.400
G12=0.337
T2=0.751
T3=0.884
T4=0.600
T5=0.220
CTmax=0.884
CTmin=0.220
BFL=1.167
EFL=1.044
TTL=4.991
T4/T1=1.500
BFL/CTmin=5.305
CTmax/G12=2.623
EFL/T1=2.610
CTmax/T5=4.018
EFL/T5=4.745
T2/T3=0.850
T4/G12=1.780
BFL/T5=5.305
T4/T5=2.727
BFL/G12=3.463
BFL/T4=1.945

FIGS. 25(a) to 25(d) respectively show simulation results corresponding to longitudinal spherical aberration, sagittal astigmatism aberration, tangential astigmatism aberration, and distortion aberration of the sixth preferred embodiment. It can be understood from FIGS. 25(a) to 25(d) that the sixth preferred embodiment is able to achieve a relatively good optical performance.

Figure 26:
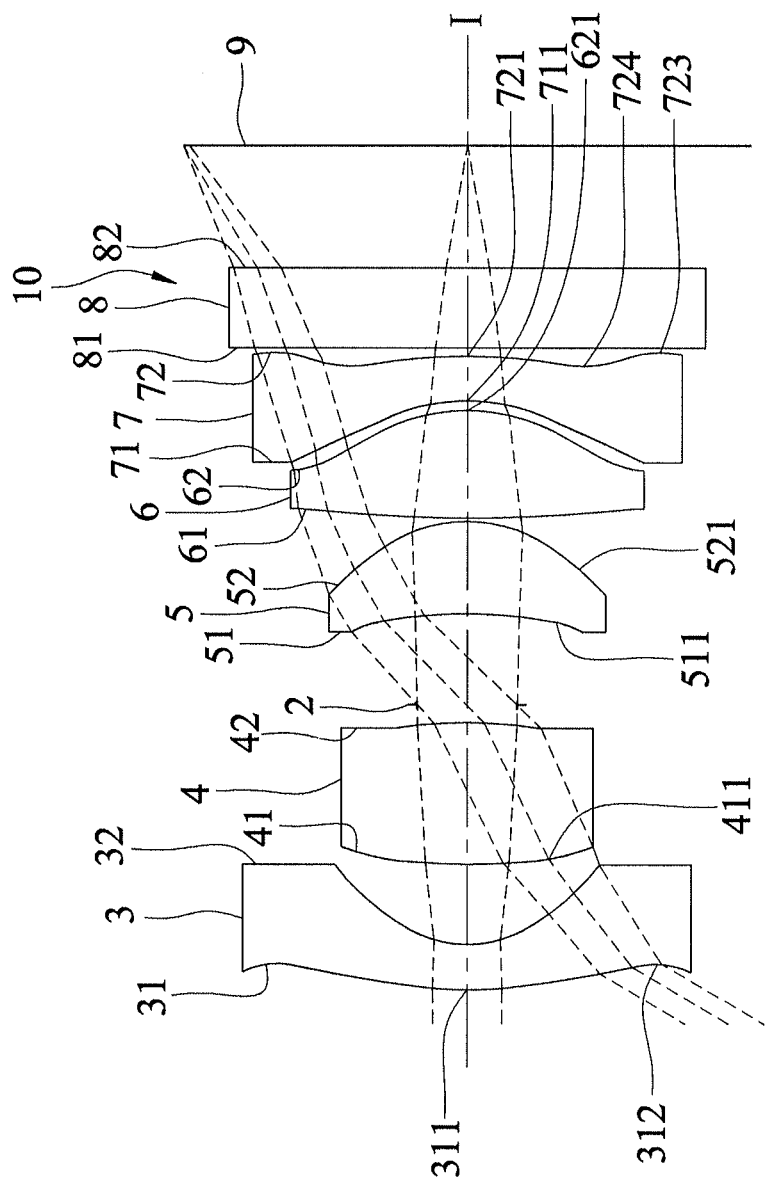
FIG. 26 is a schematic diagram that illustrates the seventh preferred embodiment of an imaging lens according to the present invention.
Figure 29:
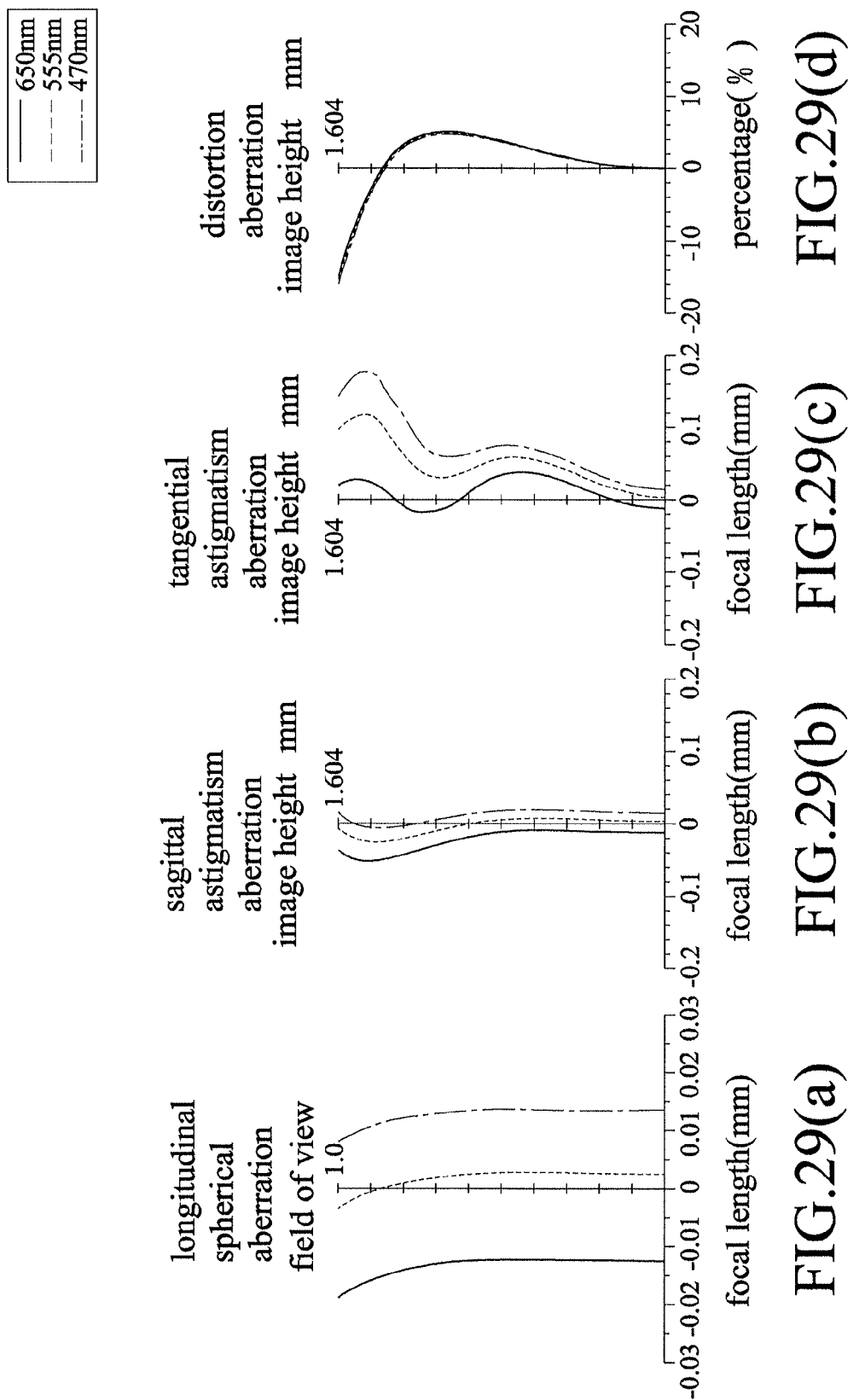
FIGS. 29(a) to 29(d) show different optical characteristics of the imaging lens of the seventh preferred embodiment.

Referring to FIG. 26, the differences between the fifth and seventh preferred embodiments of the imaging lens 10 of this invention reside in that: the object-side surface 61 of the fourth lens element 6 is a convex surface.

Shown in FIG. 27 is a table that lists values of some optical parameters corresponding to the surfaces 31-81, 32-82 of the seventh preferred embodiment. The imaging lens 10 has an overall system focal length of 1.095 mm, an HFOV of 60.0°, an F-number of 2.78, and a system length of 4.795 mm.

Shown in FIG. 28 is a table that lists values of some optical parameters of the aforementioned optical relationship (1) corresponding to the seventh preferred embodiment.

Relationships among some of the aforementioned optical parameters corresponding to the seventh preferred embodiment are as follows:

T1=0.250
G12=0.454
T2=0.801
T3=0.565
T4=0.583
T5=0.230
CTmax=0.801
CTmin=0.230
BFL=1.229
EFL=1.095
TTL=4.795
T4/T1=2.332
BFL/CTmin=5.343

CTmax/G12=1.764
EFL/T1=4.380
CTmax/T5=3.483
EFL/T5=4.761
T2/T3=1.418
T4/G12=1.284
BFL/T5=5.343
T4/T5=2.535
BFL/G12=2.707
BFL/T4=2.108

FIGS. 29(a) to 29(d) respectively show simulation results corresponding to longitudinal spherical aberration, sagittal astigmatism aberration, tangential astigmatism aberration, and distortion aberration of the seventh preferred embodiment. It can be understood from FIGS. 29(a) to 29(d) that the seventh preferred embodiment is able to achieve a relatively good optical performance.

Shown in FIG. 30 is a table that lists the aforesaid relationships among some of the aforementioned optical parameters corresponding to the seven preferred embodiments for comparison. When each of the optical parameters of the imaging lens 10 according to this invention satisfies the following optical relationships, the optical performance is still relatively good even with the reduced system length:

(1) T4/T1≤2.35: Since the present invention is a wide-angle lens that includes the fourth lens element 6 with an effective optical diameter smaller than that of the object-side surface 31 of the first lens element 3, the fourth element 6 may be made thinner. Preferably, 0.80≤T4/T1≤2.35.

(2) BFL/CTmin≥2.10: Since a sufficient distance is necessary between the image-side surface 72 of the fifth lens element 7 and the image plane 9 for placement of other elements such as the infrared cut filter 8, reduction of BFL is limited. However, CTmin does not have such a limitation. Better arrangement may be achieved when this relationship is satisfied. Preferably, 2.10≤BFL/CTmin≤5.70.

(3) CTmax/G12≤53.00: Since the first lens element 3 has the negative refractive power, sufficient G12 is necessary for spreading light to a proper range before entering the second lens element 4, thus limiting reduction of G12. However, CTmax does not have such a limitation, and may be made to be thinner for facilitating reduction of the system length. Better arrangement may be achieved when this relationship is satisfied. Preferably, 0.70≤CTmax/G12≤3.00.

(4) EFL/T1≤5.00: Since the present invention is a wide-angle lens, EFL is relatively small and a view angle thereof is relatively large. Better arrangement may be achieved when this relationship is satisfied. Preferably, 1.80≤EFL/T1≤5.00.

(5) CTmax/T5≤2.70: The fifth lens element 7 has a relatively large effective optical diameter, and is usually made to be thicker. When the dimension of the imaging lens 10 is reduced, thicknesses of all the lens elements 3-7 should be reduced. Since T5 is relatively thick, CTmax should not be made to be thicker than 2.7 times T5. Better arrangement may be achieved when this relationship is satisfied. Preferably, 0.80≤CTmax/T5≤2.70.

(6) EFL/T5≤6.00: Since the present invention is a wide-angle lens, EFL is relatively small and a view angle thereof is relatively large. Better arrangement may be achieved when this relationship is satisfied. Preferably, 1.00≤EFL/T5≤6.00.

(7) T2/T3≤1.70: Considering optical properties and manufacturing ability for the imaging lens 10 with a reduced size, better arrangement may be achieved when this relationship is satisfied. Preferably, 0.30 T2/T3≤1.70.

(8) T4/G12≤2.20: Considering optical properties and manufacturing ability for the imaging lens 10 with a reduced size, reducible ratio of G12 is relatively limited, while that of T4 is not. Better arrangement may be achieved when this relationship is satisfied. Preferably, 0.20≤T4/G12≤2.20.

(9) BFL/T5≥2.00: Considering optical properties and manufacturing ability for the imaging lens 10 with a reduced size, reducible ratio of BFL is limited. Although T5 should be made thicker for facilitating manufacturing, T5 has a relatively large reducible ratio compared to BFL. Better arrangement may be achieved when this relationship is satisfied. Preferably, 2.00≤BFL/T5≤5.70.

(10) T4/T5≤2.75: Since the fifth lens element 7 has a relatively large effective optical diameter compared to the fourth lens element 6, the fifth lens element 7 should be made thicker for facilitating manufacturing. Therefore, T4 has a relatively larger reducible ratio. Better arrangement may be achieved when this relationship is satisfied. Preferably, 0.50≤T4/T5≤2.75.

(11) BFL/G12≥1.50: Considering optical properties and manufacturing ability for the imaging lens 10 with a reduced size, BFL and G12 must be sufficiently large. Better arrangement may be achieved when this relationship is satisfied. Preferably, 1.50≤BFL/G12≤3.80.

(12) BFL/T4≥1.40: Considering optical properties and manufacturing ability for the imaging lens 10 with a reduced size, reducible ratio of BFL is relatively limited, while that of T4 is not. Better arrangement may be achieved when this relationship is satisfied. Preferably, 1.40≤BFL/T4≤3.00.

To sum up, effects and advantages of the imaging lens 10 according to the present invention are described hereinafter.

1. The first lens element 3 with the negative refractive power and the second lens element 4 with the positive refractive power may cooperate to alleviate image aberration. In addition, by virtue of the convex portion 411, the concave portion 511, the convex portion 521, the convex portion 621, and the concave portion 711, optical aberration of the image may be corrected, thereby ensuring image quality of the imaging lens 10. Since the fifth lens element 7 is made of a plastic material, weight and cost of the imaging lens 10 may be reduced.

2. Through design of the relevant optical parameters, such as T4/T1, BFL/CTmin, CTmax/G12, EFL/T1, T4/G12, and BFL/T5, optical aberrations, such as spherical aberration, may be reduced or even eliminated. Further, through surface design and arrangement of the lens elements 3-7, even with the system length reduced, optical aberrations may still be reduced or even eliminated, resulting in relatively good optical performance.

3. Through the aforesaid seven preferred embodiments, it is known that the system length of this invention may be reduced down to below 6 mm, so as to facilitate developing thinner relevant products with economic benefits.

Figure 31:
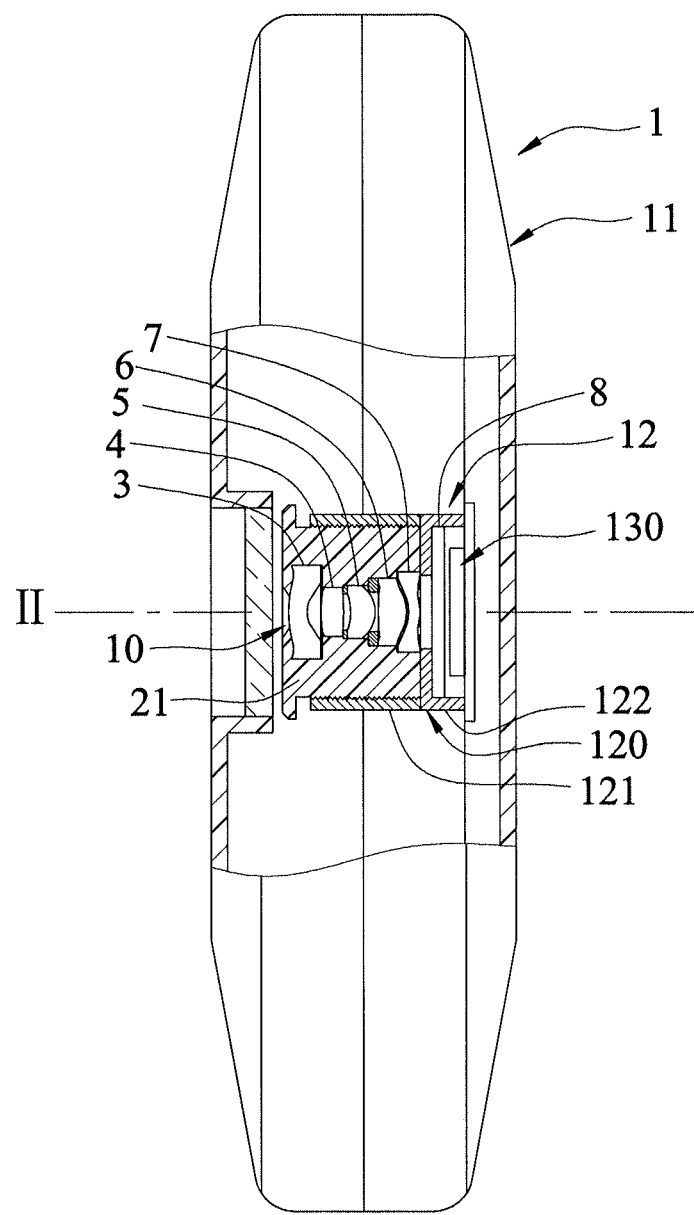
FIG. 31 is a schematic partly sectional view to illustrate a first exemplary application of the imaging lens of the present invention.

Shown in FIG. 31 is a first exemplary application of the imaging lens 10, in which the imaging lens 10 is disposed in a housing 11 of an electronic apparatus 1 (such as a mobile phone, but not limited thereto), and forms a part of an imaging module 12 of the electronic apparatus 1. The imaging module 12 includes a barrel 21 on which the imaging lens 10 is disposed, a holder unit 120 on which the barrel 21 is disposed, and an image sensor 130 disposed at the image plane 9 (see FIG. 2).

The holder unit 120 includes a first holder portion 121 in which the barrel 21 is disposed, and a second holder portion 122 having a portion interposed between the first holder portion 121 and the image sensor 130. The barrel 21 and the first holder portion 121 of the holder unit 120 extend along an axis (II), which coincides with the optical axis (I) of the imaging lens 10.

Figure 32:
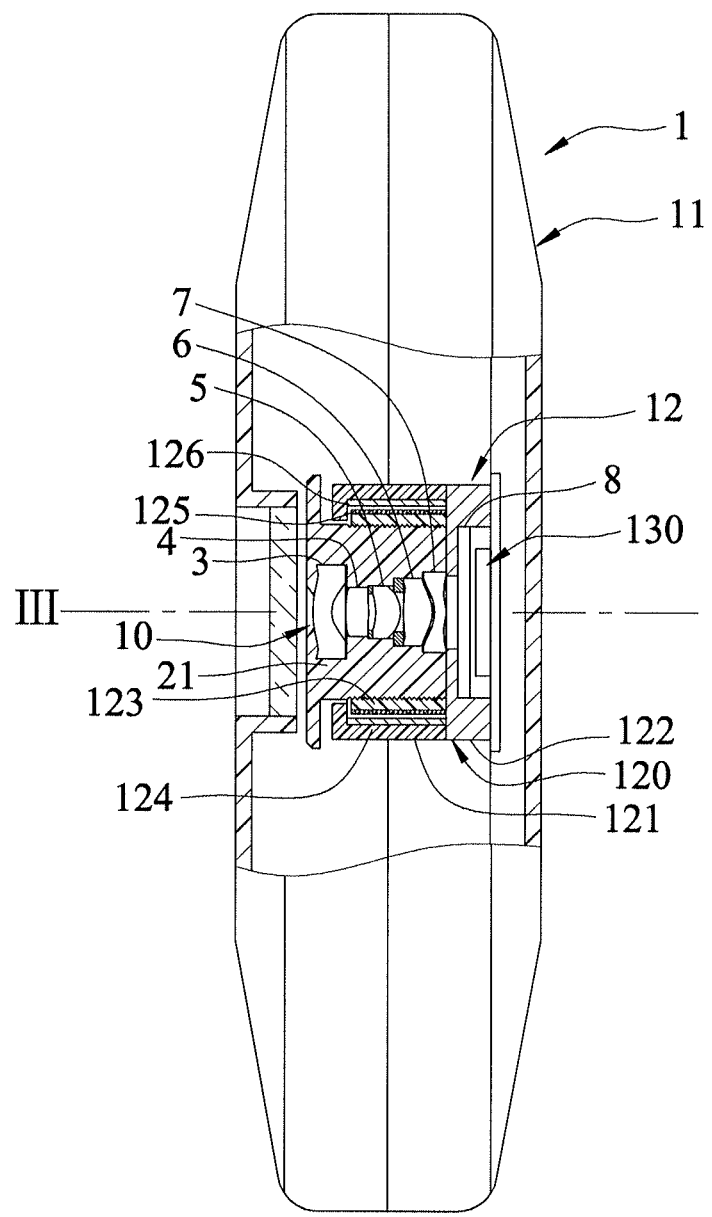
FIG. 32 is a schematic partly sectional view to illustrate a second exemplary application of the imaging lens of the present invention.

Shown in FIG. 32 is a second exemplary application of the imaging lens 10. The differences between the first and second exemplary applications reside in that, in the second exemplary application, the holder unit 120 is configured as a voice-coil motor (VCM), and the first holder portion 121 includes an inner section 123 in which the barrel 21 is disposed, an outer section 124 that surrounds the inner section 123, a coil 125 that is interposed between the inner and outer sections 123, 124, and a magnetic component 126 that is disposed between an outer side of the coil 125 and an inner side of the outer section 124.

The inner section 123 and the barrel 21, together with the imaging lens 10 therein, are movable with respect to the image sensor 130 along an axis (III), which coincides with the optical axis (I) of the imaging lens 10. The optical filter 8 of the imaging lens 10 is disposed at the second holder portion 122, which is disposed to abut against the outer section 124. Configuration and arrangement of other components of the electronic apparatus 1 in the second exemplary application are identical to those in the first exemplary application, and hence will not be described hereinafter for the sake of brevity.

By virtue of the imaging lens 10 of the present invention, the electronic apparatus 1 in each of the exemplary applications may be configured to have a relatively reduced overall thickness with good optical and imaging performance, so as to reduce cost of materials, and satisfy requirements of product miniaturization.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An imaging lens comprising a first lens element, a second lens element, a third lens element, a fourth lens element and a fifth lens element arranged in order from an object side to an image side along an optical axis of said imaging lens, each of said first lens element, said second lens element, said third lens element, said fourth lens element and said fifth lens element having a refractive power, an object-side surface facing toward the object side, and an image-side surface facing toward the image side, wherein:

said first lens element has a negative refractive power;

said second lens element has a positive refractive power, said object-side surface of said second lens element having a convex portion in a vicinity of a periphery of said second lens element;

said object-side surface of said third lens element has a concave portion in a vicinity of a periphery of said third lens element, and said image-side surface of said third lens element has a convex portion in a vicinity of a periphery of said third lens element;

said image-side surface of said fourth lens element has a convex portion in a vicinity of the optical axis;

said object-side surface of said fifth lens element has a concave portion in a vicinity of the optical axis, and said fifth lens element is made of a plastic material;

said imaging lens does not include any lens element with refractive power other than said first lens element, said second lens element, said third lens element, said fourth lens element and said fifth lens element; and said imaging lens satisfies EFL/T1 ≤5.00, where EFL represents a system focal length of said imaging lens, and T1 represents a thickness of said first lens element at the optical axis.

2. The imaging lens as claimed in claim 1, satisfying T4/T1≤2.35, where T4 represents a thickness of said fourth lens element at the optical axis.

3. The imaging lens as claimed in claim 2, further satisfying BFL/CTmin≥2.10, where BFL represents a distance at the optical axis between said image-side surface of said fifth lens element and an image plane at the image side; and CTmin represents a minimum among thicknesses of said first lens element, said second lens element, said third lens element, said fourth lens element, and said fifth lens element at the optical axis.

4. The imaging lens as claimed in claim 3, further satisfying CTmax/G12≤3.00, where CTmax represents a maximum among the thicknesses of said first lens element, said second lens element, said third lens element, said fourth lens element, and said fifth lens element at the optical axis; and G1 represents an air gap length between said first lens element and said second lens element at the optical axis.

5. The imaging lens as claimed in claim 3, further satisfying CTmax/T5≤2.70, where CTmax represents a maximum among thicknesses of said first lens element, said second lens element, said third lens element, said fourth lens element, and said fifth lens element at the optical axis; and T5 represents the thickness of said fifth lens element at the optical axis.

6. The imaging lens as claimed in claim 2, further satisfying EFL/T5 ≤6.00, where T5 represents a thickness of said fifth lens element at the optical axis.

7. The imaging lens as claimed in claim 6, further satisfying T2/T3≤1.70, where T2 represents a thickness of said second lens element at the optical axis; and T3 represents a thickness of said third lens element at the optical axis.

8. The imaging lens as claimed in claim 2, further satisfying T4/G12≤2.20, where G12 represents an air gap length between said first lens element and said second lens element at the optical axis.

9. The imaging lens as claimed in claim 8, further satisfying BFL/T5≥2.00, where BFL represents a distance at the optical axis between said image-side surface of said fifth lens element and an image plane at the image side; and T5 represents a thickness of said fifth lens element at the optical axis.

10. The imaging lens as claimed in claim 1, satisfying BFL/CTmin≤2.10, where BFL represents a distance at the optical axis between said image-side surface of said fifth lens element and an image plane at the image side; and CTmin represents a minimum among thicknesses of said first lens element, said second lens element, said third lens element, said fourth lens element, and said fifth lens element at the optical axis.

11. The imaging lens as claimed in claim 10, further satisfying T4/T5≤2.75, where T4 represents the thickness of said fourth lens element at the optical axis; and T5 represents the thickness of said fifth lens element at the optical axis.

12. The imaging lens as claimed in claim 1, satisfying T4/T5≤2.75, where T4 represents a thickness of said fourth lens element at the optical axis; and T5 represents a thickness of said fifth lens element at the optical axis.

13. The imaging lens as claimed in claim 12, further satisfying BFL/G12≥1.50, where BFL represents a distance at the optical axis between said image-side surface of said fifth lens element and an image plane at the image side; and G12 represents an air gap length between said first lens element and said second lens element at the optical axis.

14. The imaging lens as claimed in claim 1, satisfying 1.40≤BFL/T4, where BFL represents a distance at the optical axis between said image-side surface of said fifth lens element and an image plane at the image side; and T4 represents a thickness of said fourth lens element at the optical axis.

15. An electronic apparatus comprising:
a housing; and
an imaging module disposed in said housing, and including an imaging lens as claimed in claim 1, a barrel on which said imaging lens is disposed, a holder unit on which said barrel is disposed, and an image sensor disposed at the image side of said imaging lens.

16. The imaging lens as claimed in claim 1, wherein said object-side surface of said first lens element has a concave portion in a vicinity of a periphery of said first lens element.

17. The imaging lens as claimed in claim 16, wherein said third lens element has a positive refractive power.

18. The imaging lens as claimed in claim 1, wherein said third lens element has a positive refractive power.

19. The imaging lens as claimed in claim 1, wherein said image-side surface of said fourth lens element further has a concave portion in a vicinity of a periphery of said fourth lens element.

* * * * *